US005089703A

United States Patent [19]

Schoen et al.

[11] Patent Number: 5,089,703

[45] Date of Patent: Feb. 18, 1992

[54] METHOD AND APPARATUS FOR MASS ANALYSIS IN A MULTIPOLE MASS SPECTROMETER

[75] Inventors: Alan E. Schoen; John E. P. Syka, both of Santa Clara County, Calif.

[73] Assignee: Finnigan Corporation, San Jose, Calif.

[21] Appl. No.: 701,699

[22] Filed: May 16, 1991

[51] Int. Cl.[5] .................... H01J 49/42; B01D 59/44

[52] U.S. Cl. .................... 250/292; 250/290; 250/291; 250/281; 250/282

[58] Field of Search .................... 250/292, 291, 290, 281, 250/282

[56] References Cited

U.S. PATENT DOCUMENTS

| | | | |
|---|---|---|---|
| 2,939,952 | 6/1960 | Paul et al. | 250/292 |
| 3,147,445 | 9/1964 | Wuerker et al. | 330/292 |
| 3,321,623 | 5/1967 | Brubaker et al. | 250/292 |
| 3,621,464 | 11/1971 | Bryndza | 250/292 |
| 4,090,075 | 5/1978 | Brinkmann | 250/282 |
| 4,189,640 | 2/1980 | Dawson | 250/290 |
| 4,234,791 | 11/1980 | Enke et al. | 250/281 |
| 4,328,420 | 5/1982 | French | 252/292 |
| 4,329,582 | 5/1982 | French et al. | 250/292 |
| 4,535,236 | 8/1985 | Batey | 250/292 |
| 4,695,724 | 9/1987 | Watanabe et al. | 250/292 |
| 4,721,854 | 1/1988 | Dawson | 250/290 |

FOREIGN PATENT DOCUMENTS 1539607 1/1979 United Kingdom .

OTHER PUBLICATIONS

Weaver et al., "Modulation Techniques Applied to Quadrupole Mass Spectrometry", 1978, pp. 41-54.

*Primary Examiner*—Jack I. Berman
*Assistant Examiner*—Kiet T. Nguyen
*Attorney, Agent, or Firm*—Flehr, Hohbach, Test, Albritton & Herbert

[57] ABSTRACT

Apparatus and method for mass analysis with improved resolution in an r.f.-only multipole mass spectrometer by use of a supplemental r.f. field which resonantly renders ions unstable. Further, the r.f. field is frequency modulated and the output signal demodulated for mass analysis.

21 Claims, 20 Drawing Sheets

METHOD AND APPARATUS FOR MASS ANALYSIS IN A MULTIPOLE MASS SPECTROMETER

BRIEF DESCRIPTION OF THE INVENTION

This invention relates to a method and apparatus for mass analysis in a multipole mass spectrometer, and more particularly to an r.f.-only quadrupole mass spectrometer and method employing resonant ejection of ions by a supplementary r.f. field and still more particularly to a mass spectrometer apparatus and method in which the supplementary r.f. field is modulated to provide a modulated output signal which is detected and demodulated.

BACKGROUND OF THE INVENTION

Quadrupole mass spectrometers are well known in the art. A conventional mass spectrometer, shown in FIG. 1, includes an ion source 1 for forming a beam of ions 2 of the sample to be mass analyzed, a quadrupole filter which comprises two pairs of cylindrically or preferably hyperbolic rods 3 arranged symmetrically about a central axis and positioned to receive the ion beam. A voltage source 4 supplies r.f. and DC voltages to the rods to induce a substantially quadrupole electric field between the rods. An ion detector 5 detects ions which pass longitudinally through the rods from the ion source to the detector. The electric field causes the ions to be deflected or oscillate in a transverse direction. For a particular r.f. and DC field, ions of a corresponding mass-to-charge ratio follow stable trajectories and pass through the quadrupole and are detected. Other ions are caused to deflect to such an extent that they strike the rods. The apparatus serves as a mass filter. The operation of quadrupole mass filters is described in Paul, et al. U.S. Pat. No. 2,939,952.

In one mode of operation, the mass spectrometer is operated as a narrow pass filter in which the r.f. and DC voltages are selected to pass a single mass or a range of masses. In another mode of operation, the quadrupole is operated with r.f. only. The voltage of the r.f. is scanned to provide at the detector a stepped output such as shown in FIG. 2. If the r.f. voltage is increased, ions of consecutively higher mass are rejected and the ion current at the detector reduces in steps as shown in FIG. 2. Differentiation of the steps provides a mass spectrum.

In order to provide a basis for a better understanding of this invention, a theoretical explanation of the operation of a quadrupole mass filter is provided. The voltages applied to the rods set up a quadrupole field between the rods. In a quadrupole field the force on a charged particle is proportional to its displacement from the central axis or point. In the context of the present discussion, only the case for a two-dimensional electrostatic field is relevant. A two-dimensional field can be formed by four cylindrical, or preferably hyperbolic, electrodes arranged symmetrically about a central axis as described in U.S. Pat. No. 2,939,952 and shown in FIG. 1.

Opposing electrodes are connected in pairs, and the coordinate system used to describe the structure places one pair of rods on the xz plane and the other pair on the yz plane, with z as the central longitudinal axis. A voltage 2U is differentially applied to the pairs of rods such that one rod pair has a potential U and the other rod pair has a potential −U. This voltage can be an ac and/or a DC voltage. The ac voltage oscillates at a frequency f, which has units of cycles per second or hertz (Hz). The frequency can also be expressed in units of radians per second ($\omega$) by the relationship $\omega=2\pi f$. In practice this frequency is within the radio frequency, r.f., domain and so is generally referred to as the r.f. frequency. The radius of a circle inscribed within the hyperbolic electrode structure is $r_o$. The containment fields are described by equation (1).

$$\Phi(x,y,t) = (U_{DC} + U_{RF}\cos(\omega t))\left(\frac{x^2 - y^2}{r_0^2}\right) \quad (1)$$

$U_{DC}$ is the constant potential difference between the pairs of electrodes and $U_{r.f.}$ is the peak value of the time-varying portion of the potential difference between the pairs of electrodes. The frequency of the time varying portion of the field is $\omega$, which is expressed as radians per second and the term cos ($\omega$t) fixes the phase as zero at $t_o$. Taking derivatives with respect to x and y yields equations (2) and (3) which express the field gradient in the independent dimensions.

$$\frac{d\Phi}{dx} = \left(\frac{U_{DC}}{r_0^2} + \frac{U_{RF}}{r_0^2}\cos(\omega t)\right)(2x) \quad (2)$$

$$\frac{d\Phi}{dy} = \left(\frac{U_{DC}}{r_0^2} + \frac{U_{RF}}{r_0^2}\cos(\omega t)\right)(-2y) \quad (3)$$

In each dimension, the force exerted upon a charged particle is the product of the negative of the field gradient, $d\Phi/dx$ or $d\Phi/dy$ as expressed above, and the charge e. From Newton's laws it is known that force equals mass times acceleration, as in equation (4). Acceleration is $d^2x/dt^2$ for the x dimension and $d^2y/dt^2$ for the y dimension; therefore, equation (4) can be rewritten for the independent x and y dimensions as equations (5) and (6).

$$F = ma \quad (4)$$

$$e\left(-\frac{d\Phi}{dx}\right) = m\left(\frac{d^2x}{dt^2}\right) \quad (5)$$

$$e\left(-\frac{d\Phi}{dy}\right) = m\left(\frac{d^2y}{dt^2}\right) \quad (6)$$

Equations (5) and (6) can be expanded and rearranged to give equations (7) and (8) which fully describe the motion of a particle under the influence of a quadrupole field.

$$\frac{d^2x}{dt^2} + \left(2\frac{e}{m}\right)\left(\frac{U_{DC}}{r_0^2} + \frac{U_{RF}}{r_0^2}\cos(\omega t)\right)x = 0 \quad (7)$$

$$\frac{d^2y}{dt^2} - \left(2\frac{e}{m}\right)\left(\frac{U_{DC}}{r_0^2} + \frac{U_{RF}}{r_0^2}\cos(\omega t)\right)y = 0 \quad (8)$$

The only distinction between the two equations for the orthogonal planes is the change in sign, which for the ac component represents a 180 degree phase shift in the applied voltage. The motion in the xz plane is independent of the motion in the yz plane only in the sense that the motion described by the first equation is a function of the x displacement, and the motion described by the second equation is a function of the y displacement. The phase relationship to the containing field however is important, as will be seen later.

These equations of motion are differential equations of a type known as the Mathieu equation. Substitution of the definitions of $\xi$, $q_u$ and $a_u$, as shown by equations (9), (10) and (11) into the two equations of motion, equations (7) and (8), converts them into a standard form of the Mathieu equation shown in equation (12). Here the dependent variable u can be considered a generalized term for displacement, representing either the x or the y displacement. The parameter $\xi$ can be considered as a normalized unit of time such that $\xi$ increases by $\pi$ for each cycle of the r.f. field.

$$\xi = \frac{\omega t}{2} \quad (9)$$

$$q_x = -q_y = -\frac{4eU_{RF}}{m\omega r_0^2} \quad (10)$$

$$a_x = -a_y = \frac{8eU_{DC}}{m\omega r_0^2} \quad (11)$$

$$\frac{d^2u}{d\xi^2} + (a_u - 2q_u\cos(2\xi))u = 0 \quad (12)$$

The solutions to the Mathieu equation have been extensively characterized. Since the Mathieu equation is a linear differential equation its general solution will be a linear combination of two independent solutions. Equation (13) is one representation of the general solution of the Mathieu equation.

$$u(\xi) = A^1 e^{\mu\xi} \sum_{n=-\infty}^{n=\infty} C_{2n} e^{2in\xi} + B^1 e^{-\mu\xi} \sum_{n=-\infty}^{n=\infty} C_{2n} e^{-2in\xi} \quad (13)$$

The general solution is either stable or unstable depending upon whether the value of u($\xi$), which represents a particle's transverse displacement, remains finite or increases without limit as $\xi$ or time approaches infinity. This depends upon the parameters $a_u$ and $q_u$, which in turn are functions of the mass-to-charge ratio of the particle, the quadrupole dimensions, the amplitude of the applied voltages and the frequency of the r.f. voltage.

The answer to the question of the stability of an ion's trajectory lies in the parameter $\mu$. It can be shown that only for the case where $\mu$ is purely imaginary, so that $\mu = i\beta$, where $\beta$ is real and not a whole number, will the solution be stable. Using Euler's identities, the complex exponential expression for such a stable solution can be rewritten as equation (14).

$$\mu(\xi) = A \sum_{n=-\infty}^{n=\infty} C_{2n}\cos(2n+\beta)\xi + B \sum_{n=-\infty}^{n=\infty} C_{2n}\sin(2n+\beta)\xi \quad (14)$$

In this solution, n is an integer and A and B are constants of integration, which depend upon the initial conditions of position and velocity of the ion in the u dimension.

The combinations of $a_u$ and $q_u$ which yield Mathieu equations producing stable trajectories (solutions) can be described graphically by what is called a stability diagram. FIG. 3 is such a diagram. The coordinates of this diagram are the parameters of the Mathieu equation, $a_u$ and $q_u$. The shaded regions represent combinations of $a_u$ and $q_u$ which correspond to Mathieu equations yielding unstable trajectories. The unshaded regions therefore represent combinations of $a_u$ and $q_u$ which correspond to Mathieu equations which yield stable trajectories.

The above discussion of the Mathieu equation and the character of its solutions started with the demonstration that the two differential equations representing the transverse motion of an ion in transit through a quadrupole mass filter were, in fact, Mathieu equations. As stated above, the terms stable and unstable refer only to whether the ion's trajectory, u($\xi$), is bounded or unbounded as time or $\xi$ approaches infinity. For an ion to transit the mass filter without striking one of the electrodes, the equations of motion in each transverse dimension must correspond to stable motion; that is, the solutions to the equations of motion for both the x and y dimensions must be characterized as stable. The importance of such combined stability leads to construction of a combined stability diagram which characterizes the stability of the solutions of both equations of motion. Such a combined stability diagram is obtained by overlaying stability diagrams representing each equation of motion on a common coordinate system. The stability diagram for the equation of motion in the y dimension when plotted on the $a_x$, $q_x$ coordinate system (rather than the $a_y$, $q_y$ coordinate system), is identical to FIG. 3, except that it is turned upside down, as the horizontal and vertical axes are inverted. When such a diagram is overlaid with the stability diagram for motion in the x dimension a combined stability diagram is produced. The areas of overlap between x and y stability indicate regions of combined stability and relate to operating conditions that would allow ions to transit a mass filter. There are a number of areas where regions of x and y stability overlap. With respect to the operation of quadrupole mass filters, the large region of combined stability positioned on the $q_x$ axis ranging between $q_x=0$ and ca. 0.908 is the main region of interest. FIG. 4 is an enlarged view of this region of the combined stability diagram. Located further out on the $q_x$ axis, at a $q_x$ of ca. 7.5, is another small area of combined stability which is of some importance.

A distinction must be made between ions having stable trajectories which do not exceed the inner dimensions of the electrode structure and those which do. Combined stability can be considered a necessary but not a sufficient condition for transit through a quadrupole mass filter. Ions enter a quadrupole with a finite axial (z dimension) velocity and exit after a time, $t_{exit}$, which depends upon the length of the device and the axial velocity. If the ion's initial transverse displacements and velocities (initial conditions) upon entry into the quadrupole field, in combination with the parameters $a_x$ and $q_x$, specify a trajectory which achieves a displacement any greater than $r_o$ in less than the transit time, $t_{exit}$, then the ion will most likely strike an electrode and be lost. Transit depends therefore on the combination of advantageous ion entry position and velocity, generally referred to as initial conditions, as well as the stability of the ions trajectory within the quadrupole field. It should be noted that in real quadrupoles, ions having trajectories that are unstable may sometimes transit the quadrupole. This occurs only when transit times are short, initial conditions are favorable and when the $a_u$ and $q_x$ for the ion correspond to a point just outside of a boundary of a combined stable region.

Stable ion trajectories can be further characterized by their characteristic frequencies. Inspection of equation (14) reveals that a stable trajectory can be expressed as an infinite series of sinusoidal terms. The frequencies of all of these terms are defined by the main r.f. frequency, and the characteristic frequency parameter, $\beta_u$. It should be noted that in the normalized time units of the standard Mathieu equation, the frequency of the r.f. component of the quadrupole field is always 2, and that $\beta_u$ can be interpreted as a normalized frequency. $\beta_u$ is a function of $a_u$ and $q_u$ only. This functionality is expressed in FIG. 3 as iso-$\beta_x$ and iso-$\beta_y$ lines. For the combined region shown in FIG. 4, which concerns practical mass spectrometry, both $\beta_x$ and $\beta_y$ are zero (0.0) at the origin ($a_x$=0.0, $q_x$=0.0). For both the x and y dimensions, the parameter $\beta_u$ increases to 1.0 at $q_x$=0.908 along the $a_u$=0.0 axis. At the upper apex of the stability area shown in FIG. 3, $a_x$=0.237 and $q_x$=0.706, $\beta_x$=1.0 and $\beta_y$=0.0.

From equation (14) it can be shown that for any value of $\beta_u$, the terms cos $(2n+\beta_u)\xi$ and sin $(2n+\beta_u)\xi$ described a set of characteristic frequencies spaced plus or minus $(1-\beta_u)\omega/2$ from ½ω, 1½ω, 2½ω etc. This frequency pattern may be expressed in terms of ω or f. The ion's motion is a mixture of these frequencies with each contributing according to the magnitude of the coefficients, $C_{2n}$.

The coefficients, $C_{2n}$, are functions of only $a_u$ and $q_u$. As n proceeds from zero in either the positive or negative direction, the magnitudes of the coefficients, $C_{2n}$, decrease. N. W. McLachlan (Philosophical Magazine 36 [1945] pp 403-414) describes a method that allows the computation of these coefficients by arbitrarily choosing the highest subscript to be evaluated and then solving for all lower coefficients relative to the highest one. The results are then normalized to $C_0$=1.0 which is valid since A and B can be appropriately scaled also.

Ions near $\beta_u$=1.0 have a motion composed primarily of a pair of frequencies equally spaced on either side of ½f, the main r.f. frequency. There are also equally spaced pairs on either side of 1½f, 2½f, etc. but their contribution to the overall motion of the ion is less than ten percent. As the limit of $\beta_u$=1 is approached, the coefficient C−2 approaches negative one, and the component frequencies associated with n=0 and n=−1 approach f/2. For example, consider a hypothetical ion in transit through a quadrupole field. If the $a_x$ and $q_x$ for the ion are 0.0000 and 0.9000 respectively, and if the frequency of the quadrupole field is 1,000,000 Hz, the relative magnitudes and the frequencies of the components of motion of the ion would be as tabulated below. The fact statement that $a_x$ is zero indicates that the quadrupole is being operated in the r.f.-only mode. As a result, the ion motion in the x and y dimensions have identical character as $\beta_x$ and $\beta_y$ are equal and the relative magnitudes of the $C_{2n}$ are the same.

f = 1000000 Hz
$q_x$ = 0.9000
$a_x$ = 0.0
$\beta_x = \beta_y$ = 0.915911

| | | |
|---|---|---|
| n = −3 | $C_{-6}$ = −0.0027315 | $5f/2 + (1 - \beta_x)f/2$ = 2.542045 Mhz |
| n = −2 | $C_{-4}$ = 0.0783999 | $3f/2 + (1 - \beta_x)f/2$ = 1.542045 Mhz |
| n = −1 | $C_{-2}$ = −0.8258339 | $f/2 + (1 - \beta_x)f/2$ = 0.542045 Mhz |
| n = 0 | $C_{+0}$ = 1.0000000 | $f/2 - (1 - \beta_x)f/2$ = 0.457955 Mhz |
| n = 1 | $C_{+2}$ = −0.1062700 | $3f/2 - (1 - \beta_x)f/2$ = 1.457955 MHz |
| n = 2 | $C_{+4}$ = 0.0039605 | $5f/2 - (1 - \beta_x)f/2$ = 2.457955 MHz |
| n = 3 | $C_{+6}$ = −0.0000745 | $7f/2 - (1 - \beta_x)f/2$ = 3.457955 MHz |

When $q_x$ is closer to the stability limit, one finds the values for $C_0$ and $C_{-2}$ to be nearly equal in magnitude which indicates that the ion's trajectory is primarily a mixture of two sinusoidal components of nearly equal magnitude with frequencies very close to f/2. The relative magnitudes and frequencies of the two primary components of motion for this case are as tabulated below.

$q_x$ = 0.907590
$a_x$ = 0.0
$\beta_x = \beta_y$ = 0.980000

| | | | |
|---|---|---|---|
| n = 0 | $C_{+0}$ = 1.0000000 | $f/2 - (1 - \beta_x)f/2$ = | 0.490000 MHz |
| n = −1 | $C_{-2}$ = −0.9556011 | $f/2 + (1 - \beta_x)f/2$ = | 0.510000 MHz |

Such a trajectory is represented graphically in FIG. 5. The trajectory is plotted for the normalized time interval from $\xi$=0 to 200, which is equivalent to 63.66 cycles of the frequency. This translates to 63.66 microseconds for this example. The two components of ion motion exhibit 31.19 and 32.46 cycles during this interval, a difference of 1.27 cycles. The composite trajectory appears as sinusoidal motion having a frequency of f/2, the average of the two frequencies associated with dominant components of the ion motion, undergoing beats. The frequency of these beats is difference between these same two component frequencies. When the $q_u$ for the ion is lower than ca. 0.4 only the coefficient corresponding to n=0 is significant, so the ion's motion is predominantly composed of a sinusoidal component of frequency $\beta_u\omega/2$. This is illustrated in FIG. 6 which shows a trajectory for an ion having $q_u$=0.2.

While the previous examples are for cases where there is no DC component of the quadrupole field, the illustrated dependence of the character of ion motion on the parameter $\beta_u$ is generally applicable to cases where $a_x$ is non zero. While $a_x$ and $q_x$ determine both $\beta_x$ and $\beta_y$, $\beta_x$ and $\beta_y$ define the character of the motion in the x and y dimensions. Often in discussing the motion of ions, it is more descriptive, and therefore useful, to describe an ion in terms of its $\beta$ in a particular dimension than its corresponding $a_x$ and $q_x$. When discussing motion in an r.f. only quadrupole, $q_x$ and $\beta_x$ are often used interchangeably as one uniquely defines the other. The relationship between $q_x$ and $\beta_x$ when a DC component to the quadrupole field is absent, i.e. $a_x$=0, is of considerable importance to the discussion which follows. At low values of $q_x$ on the $a_x=0.0$ axis one finds that a simple linear approximation is adequate to describe this relationship as shown in equation (15).

$$\beta_u \simeq \frac{q_u}{\sqrt{2}} \text{ for } \beta_u < 0.4 \quad (15)$$

The change in $\beta_x$ with respect to $q_x$ may be found by differentiation to be approximately 0.7071 as shown in equation (16).

$$\frac{d\beta_u}{dq_u} \simeq \frac{1}{\sqrt{2}} = .7071 \text{ for } \beta_u < 0.4 \quad (16)$$

This approximate relationship holds up to about $\beta_x=0.4$ where the slope begins to increase. It continues to increase asymptotically until, at the stability limit, where $\beta_x$ equals one and $q_x$ equals ca. 0.908, the slope is infinity. This means that for values for $q_x$ near the stability limit, a small change in $q_x$ will have a large effect upon $\beta_x$ and therefore the corresponding frequency components of the ion motion. This frequency dispersion is of fundamental importance to this invention.

Up to this point the discussion has dealt exclusively with the trajectories of ions in transit though a purely quadrupolar field. However, as will be described below, it can be useful to modify the potential field by adding small auxiliary field components having frequencies other than that of the main field. The most simple form of an auxiliary field is a dipole field. A dipolar potential field results in a electric field that is independent of displacement. The equations of motion for an ion in transit through such a perturbed quadrupole field have the form shown in equation (17).

$$\frac{d^2u}{d\xi^2} + (a_u - 2q_u\cos(2\xi))u = p_u\cos(\alpha\xi - \theta_\alpha) \quad (17)$$

This equation of motion is simply a forced version of the Mathieu equation. The term on the right hand side of the equation represents the additional component of force the ion is subject to in the dimension of interest, u, due to the dipolar auxiliary field. The parameter $P_u$ is proportional to the magnitude of the auxiliary electric field component in the u dimension. The parameters $\alpha$ and $\theta_\alpha$ represent the frequency, in normalized units, and the phase of the sinusoidally varying auxiliary field. The relationship between the unnormalized frequency of the auxiliary field, $f_\alpha$, and $\alpha$ is given in equation (18). The effect of this extra force term is strongly dependent upon the frequency of the auxiliary field.

$$f_\alpha = \alpha\frac{f}{2} \quad (18)$$

If this frequency, $\alpha$, matches any of the component frequencies of the ions' motion, $(2n+\beta_u)$, then a resonance condition exists. The general oscillatory character of the motion remains the same; however, the amplitude of the oscillatory motion grows linearly with time. The rate of growth of the amplitude of the ion's oscillatory motion is proportional to both the magnitude of the auxiliary field and the relative contribution of the component of unforced motion, as represented by $C_{2n}$, in resonance with the applied field. Even though only one component of the ion's motion is in resonance with the auxiliary field, all components of the ions trajectory grow in concert thus maintaining their relative contribution to the trajectory.

When the frequency of the auxiliary field is only very close to one of the ion's resonant frequencies, the resultant ion oscillation beats with a frequency equal to the difference between the auxiliary field frequency and any nearby ion resonant frequencies. In the case where the auxiliary frequency corresponds to an $\alpha$ near unity, and the $\beta_u$ describing the ion's resonant frequencies in the field is near 1.0, the resultant trajectory has multiple beats as there are two resonant frequencies near the auxiliary frequency.

When the frequency of the auxiliary field is not close to any of the ion's resonant frequencies, the resultant ion oscillation is largely unaffected. Rigorous analysis shows that the presence of an auxiliary field always has some effect on an ion's trajectory, however, if the difference in frequency between the frequency of the auxiliary field, $\alpha$, and the closest ion resonant frequency, $2n+\beta_u$, is greater than a percent, $|\alpha-(2n+\beta_u)|/\beta_u>0.01$, then the portion of the ion's trajectory due the auxiliary field will be negligible. The ion will essentially behave as if there were no auxiliary field present. This of course is assuming that the magnitude of the auxiliary field is relatively small.

So far we have discussed ion motion in the presence of a sinusoidally varying dipolar auxiliary field. Certainly, the auxiliary dipole field could vary in a more complicated way such that the right hand side of Equation (17) would become a generalized function of time, $P_u(\xi)$, as is shown in equation (19).

$$\frac{d^2u}{d\xi^2} + (a_u - 2q_u\cos(2\xi))u = p_u(\xi) \quad (19)$$

Fourier theory says that if $P_u(\xi)$ is periodic, then it can be expressed as an infinite series of sines and cosines having harmonic frequencies. Even if $P_u(\xi)$ is not periodic it can be represented as an integral (a sort of sum) of sine and cosine terms having differentially spaced frequencies. Hence auxiliary fields having complicated time variance can be treated as the sum of multiple dipolar auxiliary fields, each varying sinusoidally and each having a different frequency. This results in a $P_u(\xi)$ that is the sum of multiple cosine terms. Since the Mathieu equation is a linear differential equation, it has the useful property that superposition applies to its solutions. One can consider the trajectory described by Equation (19) as the sum of multiple independent trajectories, one accounting for ion motion in the absence of any auxiliary field, and other trajectories accounting for the motion associated with each frequency component of the auxiliary field.

$$\Phi_s(x,y,t) \approx U_s(t)\left(\begin{array}{l} .80\left(\frac{x}{r_0}\right) \\ +.15\left(\left(\frac{x}{r_0}\right)^3+3\left(\frac{x}{r_0}\right)\left(\frac{y}{r_0}\right)^2\right) \\ +.03\left(\left(\frac{x}{r_0}\right)^5-10\left(\frac{x}{r_0}\right)^3\left(\frac{y}{r_0}\right)^2+5\left(\frac{x}{r_0}\right)\left(\frac{y}{r_0}\right)^4\right) \\ +.01\left(\left(\frac{x}{r_0}\right)^7-21\left(\frac{x}{r_0}\right)^5\left(\frac{y}{r_0}\right)^2+35\left(\frac{x}{r_0}\right)^3\left(\frac{y}{r_0}\right)^4-7\left(\frac{x}{r_0}\right)\left(\frac{y}{r_0}\right)^6\right) \end{array}\right) \quad (20)$$

For actual quadrupole mass filters, a dipolar auxiliary field can be created by symmetrically applying a differential voltage, $2U_s(t)$, between opposing electrodes in addition to the common mode voltage, U(t) or −U(t), applied to both opposing electrodes in order to generate the main quadrupole field. For example, to establish an auxiliary dipole field oriented so that ions are only subject to an auxiliary force in the x dimension, one applies voltages $U(t)+U_s(t)$ and $U(t)-U_s(t)$ to the +x and −x electrodes, respectively, and a voltage of −U(t) to both the +y and −y electrodes. The resultant auxiliary potential field is predominately dipolar but it is not purely dipolar. FIG. 7 shows lines of equipotential in a cross section view of an auxiliary field applied to hyperbolic electrodes. Since FIG. 7 represents only the auxiliary portion of the potential field, the −x (left-hand) electrode has a potential of $-U_s(t)$, the +x (right-hand) electrode has a potential of $U_s(t)$ and both the +y and −y (upper and lower) electrodes have potentials of zero. For a purely dipolar field the equipotential lines would be parallel. In W. Paul's original patent, it is recognized that generating an auxiliary field in such a manner would not result in a purely dipole auxiliary field. The curvature of the equipotential lines in FIG. 7 is due to the higher order terms in a polynomial expansion that mathematically describe this auxiliary potential field. Equation (20) is a truncated polynomial expansion approximately describing the auxiliary potential field, $\Phi_s(x,y,t)$. This truncated expansion represents the auxiliary potential as a sum of first-order (dipole), third-order (hexapole), fifth-order (decapole) and seventh-order component fields. FIG. 7 was obtained using the computer program SIMION PC/AT which models potential fields using a grid relaxation technique. Equation (20) was obtained by a fit to the estimated potentials obtained by SIMION PC/AT. The dipole component of such an auxiliary field for the x dimension may be expressed as equation (21).

$$p_x(\xi) \simeq -.8\frac{4e}{r_0 m\omega^2}U_s(\xi) \quad (21)$$

This equation may be substituted for the term $p_x(\xi)$ in the normalized equation of motion for the x dimension version of equation (19). If the potentials applied to the +x and −x electrode were not applied symmetrically relative to both y electrodes, there would also be second-order (quadrupole) and, perhaps, if the electrodes had round rather than hyperbolic contours, higher even-order components of auxiliary field. It can be seen in equation (20) that the dipole and hexapole components account for most of the auxiliary field. The effect of the higher order components of the auxiliary field on the ion motion is a very difficult issue. The equations of motion that result when hexapole or higher order auxiliary field components are considered are nonlinear and coupled. Unlike the case of motion for ions in combined dipole and quadrupole fields, motion in the x dimension is effected by motion in the y dimension and vice versa. This means that x appears in the y dimension equation of motion and y appears in the x dimension equation of motion. This also means that there are terms in these equations of motion that are second order or greater. More specifically, there are terms of the form $x^a y^b$, where a+b is greater than unity, in the equations of motion. Even if only dipole and quadrupole components of the auxiliary field are considered in formulating the equations of motion, the resulting equations of motion are still very difficult to solve. All such equations are generally amenable only to numerical methods or approximation methods, such as perturbation methods, for their solution. Using perturbation methods it can be shown that higher order sinusoidally varying auxiliary field components cause resonances at frequencies, α, other than those expected from the purely dipole auxiliary field model; however, these resonances are not nearly as strongly excited as a resonance excited by the main dipole component of the auxiliary field. If the magnitude of the auxiliary field is small enough so that, while in transit of the quadrupole, only ions having very narrow range of $q_x$ would have trajectories significantly altered by the presence of the dipole component of auxiliary field, then it is unlikely that the effect of the higher order components of the auxiliary field will have a significant effect on the trajectories of ions regardless of their $q_x$.

If the magnitude of the auxiliary field is relatively large, resonances attributable the higher order auxiliary field components can be significant. These effects have been observed experimentally.

Theoretically it possible to create an auxiliary potential that is primarily composed of higher order components. However, this would most likely involve altering the design of the quadrupole electrode structure which would compromise purity of the main quadrupole field. The one exception to this is that one can apply a very pure quadrupole auxiliary field simply by adding a different frequency component to the voltage applied between electrode pairs. A well known resonance associated with quadrupolar auxiliary fields is defined in Equation (22).

$$\alpha = 2\beta_u \quad (22)$$

The disadvantage of using a quadrupole auxiliary field is that resonances will occur in both the x and y dimension simultaneously. A dipole field can be oriented, as is the one described above, so as to cause resonance in only a single dimension of motion.

Usually, when a linear quadrupole field is used as a mass filter, both r.f. and DC voltages are employed. In this case, the apex of the first stability region is cut by a line, representing the locus of all possible masses, which passes through this apex as seen in FIG. 4. Mass is inversely related to $q_x$. For an arbitrary r.f. voltage, $U_{r.f.}$, ion masses can be thought of as points which are spaced inversely with mass along the line such that infinite mass is at the origin and mass zero is at infinity. This is known as the scan line. The range of masses which map within the stability region along this line defines the mass range that will pass the mass filter. The slope of this line is determined by the ratio of the r.f. and DC voltages, which sets the resolution by limiting the minimum and maximum q values that permit an ion to pass. The range of $q_x$ that corresponds to the portion of a given scan line that is within the stability region is sometimes referred to as the transmission band. Proper choice of the r.f./DC ratio allows only one ion mass to pass at a time. To obtain a mass spectrum, the r.f. and DC voltages are increased. The position of ion masses on the scan line shift away from the origin, bringing successive ion masses through the narrow tip of the stability region. Higher masses are spaced closer on the line, so, to maintain unit mass resolution, the slope of the line must increase as mass increases. A plot of ion current detected at the quadrupole exit versus the applied voltage is a mass spectrum.

A convenient way to visualize this process is to imagine the scan line as an elastic string, with one end fixed to the origin of the stability diagram. Individual masses are represented as points marked on the string. The spacing is inversely proportional to mass, therefore, the spacing is closer towards the origin where higher masses are found than it is at the low mass end of the string. Increasing the amplitude of the r.f. and DC voltages has the effect of stretching the string. As the string is stretched, the slope is increased gradually so that only one mark falls within the stability region at a time.

There are several problems with this mode of operation. The most severe is the ion transmission penalty encountered as resolution is increased at high mass. A second problem is the sensitivity to contamination, primarily due to charge accumulation, which distorts the quadrupole fields. Operation modes involving r.f.-only fields have been proposed to overcome these deficiencies.

The simplest r.f.-only mass filter uses the high $q_x$ cutoff to provide a high pass filter. At a given r.f. voltage setting, the higher masses, which have $q_x$s lower than 0.908, have stable trajectories while the lower masses, which have $q_x$s above 0.908 will have unstable trajectories. A scan of the r.f. voltage from low amplitude to high amplitude while detecting the ion current exiting the mass filter produces a plot of detected ion current versus voltage that resembles a series of decreasing stair steps. These steps, in general, have neither consistent spacing nor height. The r.f. voltage at which each step occurs corresponds to the passing from stability to instability of a particular ion mass present in the ion beam. The magnitude of each vertical transition is proportional to the abundance of a corresponding ion mass present in the ion beam injected into the mass filter. The first derivative of this curve is a mass spectrum.

There are several problems with the straightforward approach to converting the measured ion current versus r.f. voltage stair step function to a mass spectrum. Due to the statistical variation inherent in the rate of ion arrival at any ion detector, there is a noise component associated with any detected ion current signal. This noise, is essentially white as it has a uniform power spectrum. The magnitude of this ion statistical noise is proportional to the square root of the average intensity of the detected ion current signal. Small mass peaks are seen in the undifferentiated ion signal as small steps on a large offset produced by the transmission of all higher masses. The process of differentiation enhances the high frequency components of the signal relative to the low frequency components. The ion statistical noise accompanying this large ion signal offset when enhanced by differentiation interferes with the observation of small mass peaks.

For well-constructed quadrupoles there can be an anomalous peak associated with the small stability region near $a_x,q_x=0.0,7.5$ in which ions of lower mass are stable. If the mass filter is operated as a broad band mass filter, but not r.f. only, the ratio of $a_x$ to $q_x$ can be maintained such that the artifact signal associated with this higher stability region can be avoided.

Another problem is the variation of ion transit probability within the transmission band. Any change in ion transmission as a function of $q_x$, and therefore the r.f. voltage, will induce a response. Genuine mass peaks are difficult to distinguish in the presence of this uncorrelated response.

The r.f.-only operation mode can only be useful as a mass spectrometer if the stair step in the detected ion current to r.f. voltage function can be converted into mass peaks without amplifying the noise. Several ways to do this have been proposed and reduced to practice. In U.S. Pat. No. 4,090,075 granted in 1972, U. Brinkman disclosed a method for overcoming some of the limitations outlined above. As ions become unstable at high $q_x$, they take on a large transverse kinetic energy. In the fringing fields at the exit of the quadrupole, the large radial excursions subject the ions to intense axial fields, thereby causing them to acquire large axial kinetic energies. Placement of a retarding grid between the exit and the ion detector forms a coarse kinetic energy filter, which only passes those ions near the stability limit.

Another method, which takes advantage of the exit characteristics of ions near a stability limit, uses an annular detector which is described by J. H. Leck in British Patent 1,539,607. This scheme uses a central stop, biased to attract ions with low radial energies. Ions that possess enough transverse energy to avoid the central stop are collected on a ring that surrounds the central electrode.

In U.S. Pat. No. 4,189,640 granted Feb. 19, 1980, P. H. Dawson presents an alternative annular design that uses grids. The first grid is placed immediately following the r.f.-only quadrupole exit and is strongly biased to attract ions. A central stop is fixed to the grid to block axial ions from passing, and a second grid is placed to decelerate the ion beam. Ions of interest can then pass to a detector placed after the grids.

All of these techniques share the common strategy for reducing both major noise sources. They all attempt to detect only ion currents carried by ion masses that are very near the transition from stability to instability. This minimizes the ion statistical noise signal and thus improves detection limits. Although impressive results at low mass have been shown in the literature, attempts to apply these methods at higher mass have shown mass dependant leading edge liftoff which restricts their usefulness.

Modulation techniques have also been employed to convert the r.f.-only ion intensity function into mass peaks. The method involves encoding the component of the ion current signal corresponding to an ion mass at the stability threshold with a specific frequency and then using phase sensitive detection to monitor only that frequency. This eliminates the need to perform differentiation to obtain a mass spectrum. Coherent noise that falls outside the bandpass of the filter used in the detection system is discriminated against, thereby improving the signal to noise ratio.

This methodology was first used for r.f.-only mass spectrometry by H. E. Weaver and G. E. Mathers in 1978 (Dynamic Mass Spectrometry 5 (1987) pp 41–54). Their technique modulates the amplitude of the r.f. voltage at a specific frequency. The amplitude of the modulation of the r.f. voltage is a very small percentage of the average amplitude of the r.f. voltage. When the average r.f. amplitude is such that a particular ion mass has an average $q_x$ that approaches to the high $q_x$ stability limit, this threshold mass is brought in and out of stability at the same frequency as the amplitude modulation of the r.f. voltage. The modulation of the r.f. voltage thus alternately allows and prevents the transit of ions having the threshold mass through the mass filter to the detector. The component of the detected ion current carried by ions having this threshold mass is thus converted into an AC signal having frequency components equal to the frequency of the r.f. voltage amplitude modulation and its harmonics.

P. H. Dawson U.S. Pat. No. 4,721,854) presents a similar idea in which the DC component of the quadrupole field is modulated rather than the r.f. component of the quadrupole field. In this approach, ion stability is modulated by varying the stability parameter $a_x$. By changing the amplitude of a small DC quadrupole voltage at a frequency which is low compared to the ion flight time through the quadrupole, the transmission of an ion mass corresponding to values of $q_x$,$a_x$ near the $\beta_x=1$ or $\beta_y=1$ stability limit is modulated.

These modulation methods suffer from the substantial deficiency that the means used to modulate the current carried by ions having the mass of interest also weakly modulates the current carried by higher mass ions having corresponding $a_x$s and $q_x$s that are well within the stability region. This occurs because there is some variation in ion transmission with $a_x$ and $q_x$ throughout the stability region. The modulated ion current associated with ion masses not at the stability threshold is effectively a noise signal. Neither of these techniques, when implemented as true r.f. or AC only techniques, avoid the generation of artifact peaks associated with the small stability region at $a_x=0$, $q_x=7.5$.

The idea of using resonance excitation with r.f.-only quadrupoles is not new. In 1958 W. Paul, et al. (Zeitschrift fur Physik 164, 581–587 (1961) and 152, 143–182 (1958) described an isotope separator that uses an auxiliary dipole AC field to excite the oscillatory motion of an ion contained within an r.f.-only quadrupole field. This mass filter is operated so that the isotopes of interest are near the center of the stability diagram, such as near (a=0.0, q-0.6). This r.f.-only field will have no mass separation capability for the isotopes but the ion transmission will be very good. The auxiliary AC field is tuned to the fundamental frequency of ion motion for a specific isotopic mass. When this auxiliary field is included, ions of the selected mass will absorb energy and their amplitude of oscillation will increase. The trajectories of ions of nearby masses will also be affected. Their amplitude of oscillation will be modulated at a beat frequency equal to the difference between the excitation frequency and their frequency of motion. If the envelope of this amplitude modulation is greater than $r_o$, the ion will not be transmitted. The auxiliary field can be either a quadrupole field applied at twice the frequency of ion motion, or it can be a dipole field applied at the frequency of ion motion. This excitation forms a basis for mass separation by eliminating one or a group of isotopes while permitting the desired isotope to be transmitted; however, this method relies on knowledge of the distribution of ion masses in the ion beam being injected into the quadrupole mass filter.

The use of auxiliary quadrupole and dipole resonance fields to add energy to an ion or electron beam is also discussed in detail with an excellent gravitational model in U.S. Pat. No. 3,147,445 by R. F. Wuerker and R. V. Langmuir, granted Sept. 1, 1964. That patent covers many applications of r.f.-only quadrupoles to manipulate ion or electron beams for electronic signal conditioning applications.

In U.S. Pat. No. 3,321,623 granted May 23, 1967 to W. M. Brubaker and C. F. Robinson, it is claimed that an auxiliary dipole field enhances the effectiveness of a quadrupole field by forcing ions from the axis to a larger radial displacement, where the quadrupole field has a greater effect. In practice, however, it can be shown that an oscillating dipole field of sufficiently small magnitude will have no noticeable effect unless its frequency is close to a frequency of the ion's natural motion.

OBJECTS AND SUMMARY OF THE INVENTION

It is an object of this invention to provide an apparatus and method for improving the resolution of a mass spectrometer operated with r.f. only.

It is another object of the invention to provide an apparatus and method which further improves upon the resolution of the various prior art methods of resolution improvement.

It is another object of the invention to provide a mass spectrometer in which a dipole field or other supplementary field is added to the main r.f. field to cause selected ions to oscillate and be rejected.

It is a further object of the invention to provide a mass spectrometer with a dipole or other supplementary field which is modulated to provide a method of detecting the rejection of ions.

These and other objects of the invention are achieved by a quadrupole mass spectrometer having a plurality of parallel pairs of rod electrodes, an ion source for projecting a beam of charged particles, ions, through said rods, and a detector for receiving ions which pass through the rods and provide an output signal in which means are provided for applying an r.f. voltage to said pairs of rods to generate a quadrupolar r.f. field in the space between rods in which ions in said beam are stable only within the stability boundary of the a,q values and means for superimposing a supplementary r.f. dipole field on said r.f. field to excite one or more frequencies of the ions' natural motion in the transverse direction to eject ions by resonance instability. The invention is further characterized in that the supplemental r.f. voltage is frequency modulated at a predetermined rate whereby the output signal from said detector can be demodulated.

DESCRIPTION OF THE PREFERRED EMBODIMENTS

Figure 1:
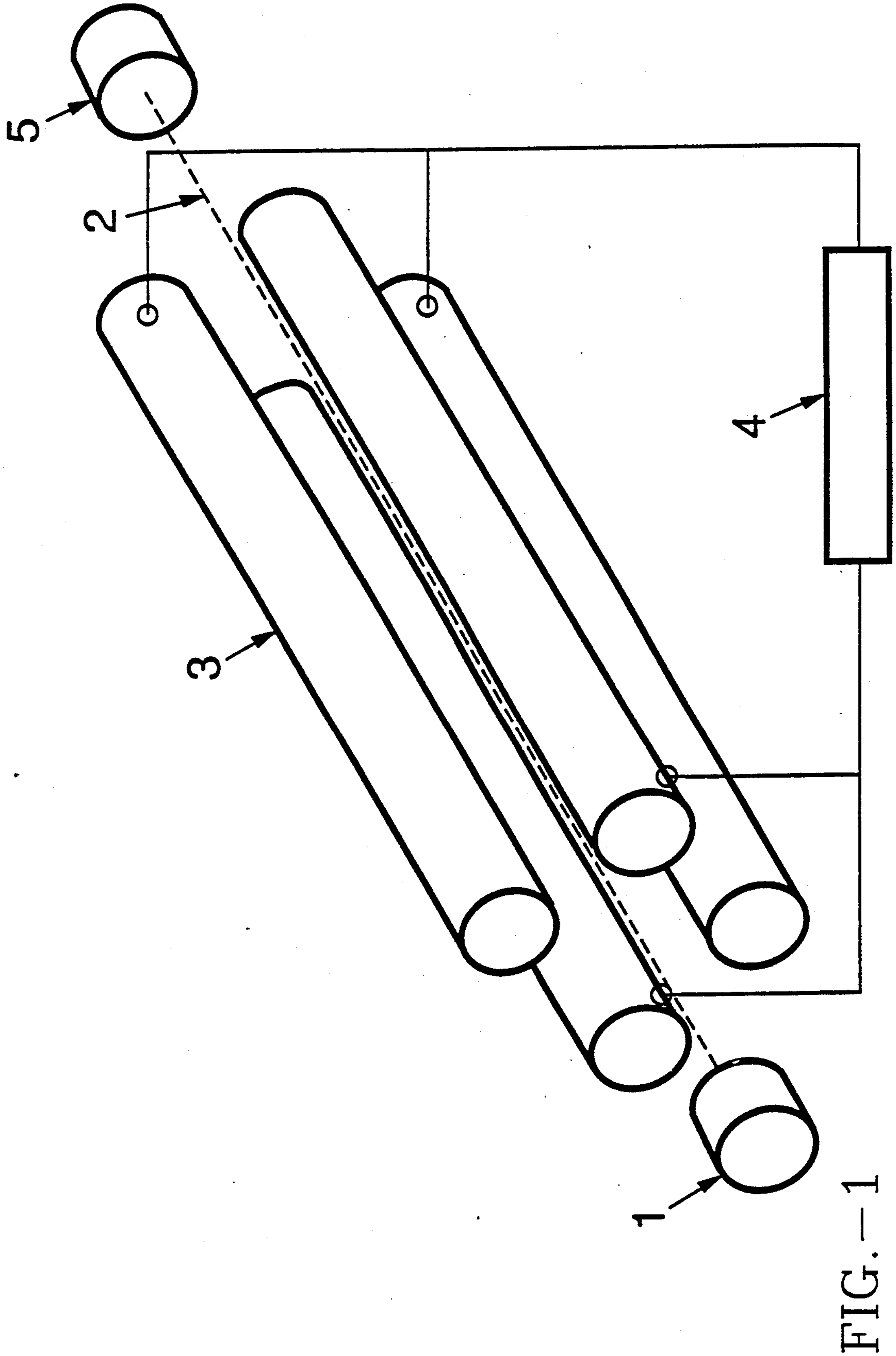
FIG. 1 is a schematic diagram of a linear quadrupole mass spectrometer.
Figure 2:
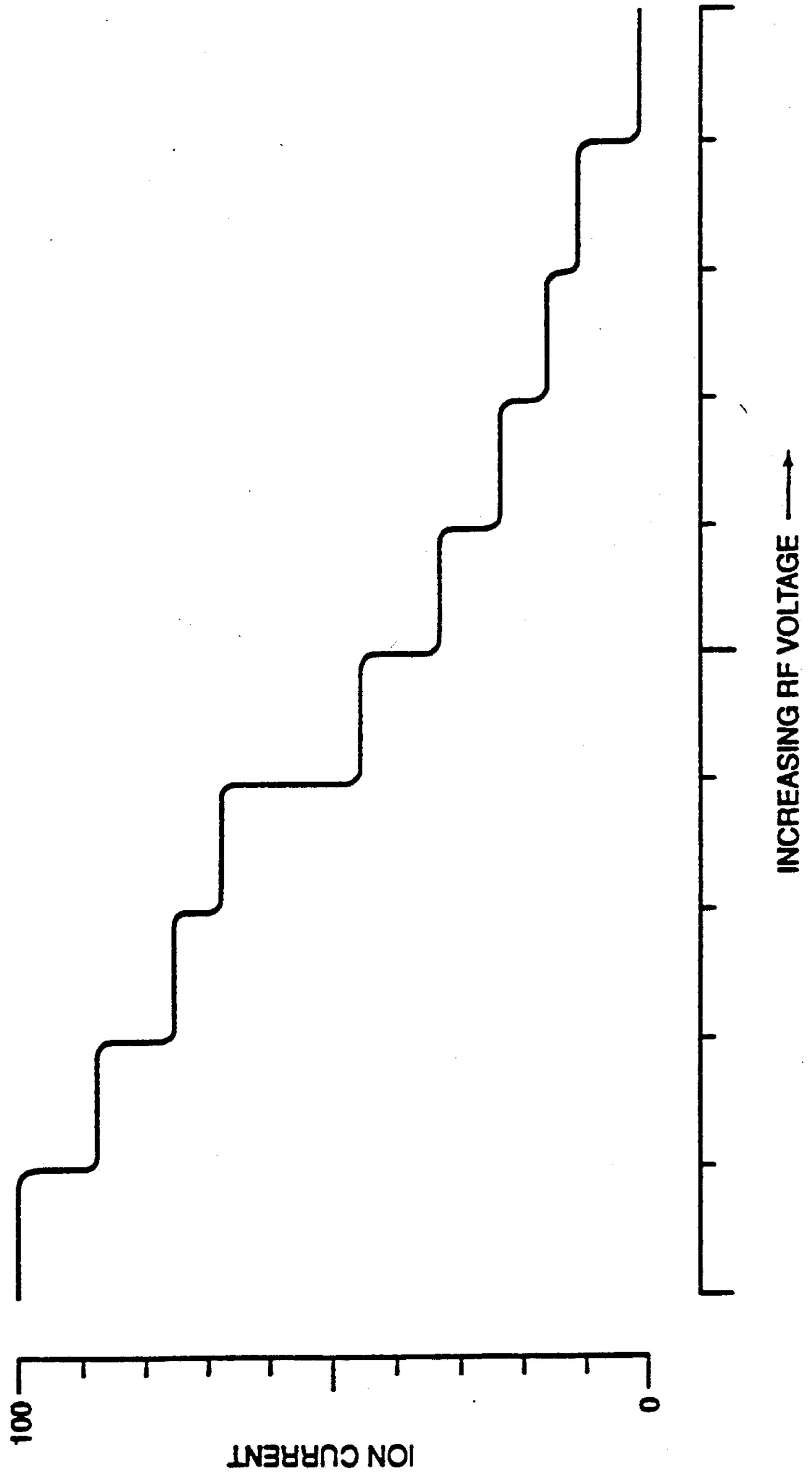
FIG. 2 shows the transmission of ions in an r.f.-only quadrupole mass spectrometer as the r.f. level is scanned.
Figure 3:
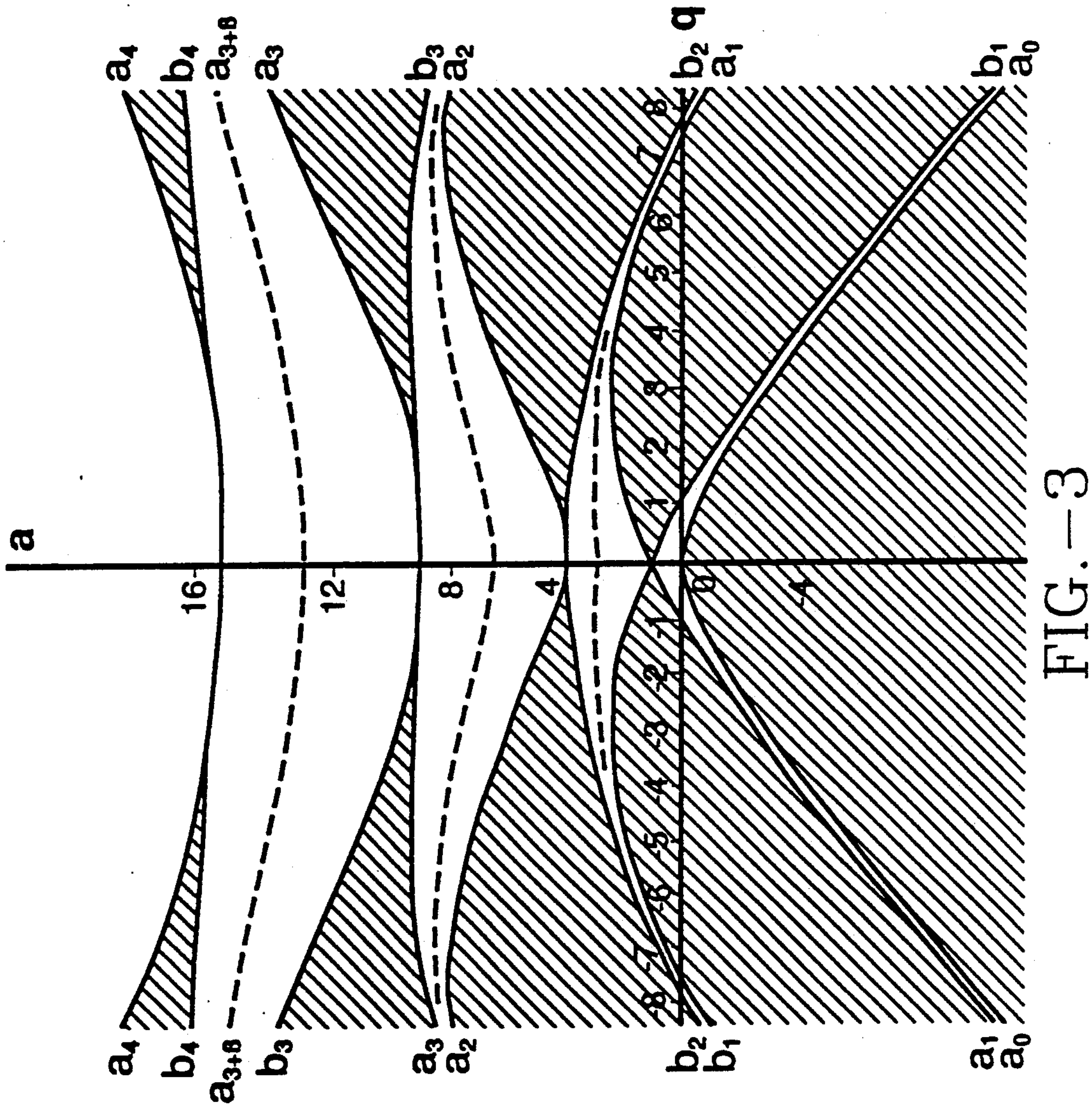
FIG. 3 shows the General Mathieu Stability diagram.
Figure 4:
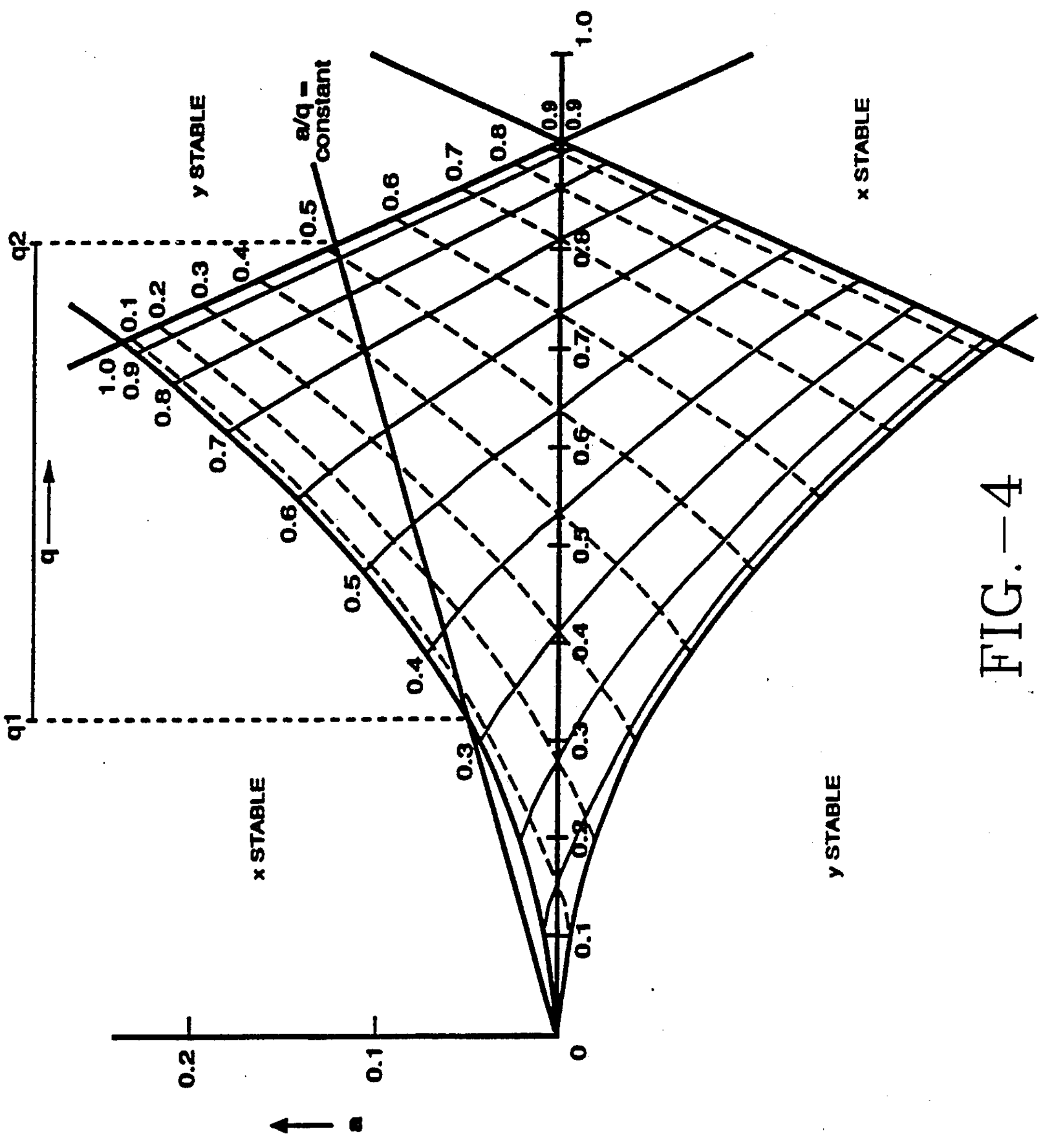
FIG. 4 shows the a,q stability diagram obtained by overlap of x and y stability.
Figure 5:
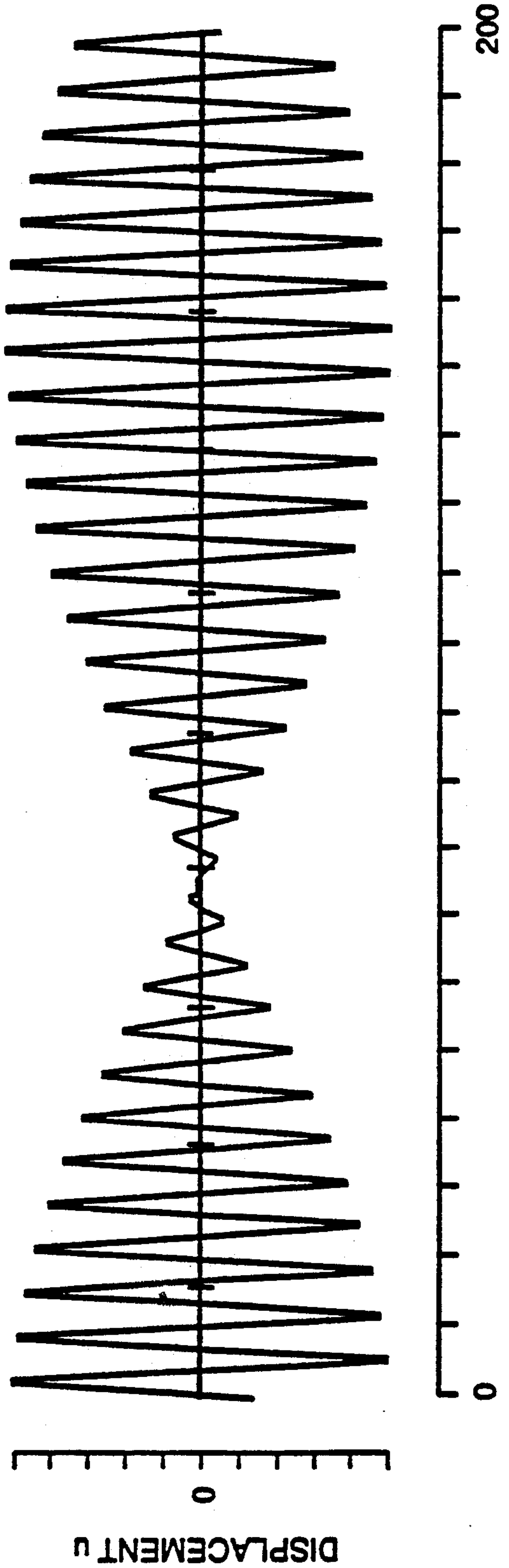
FIG. 5 shows ion trajectory for $\xi=0$ to 200 at $q=0.907590$.
Figure 6:
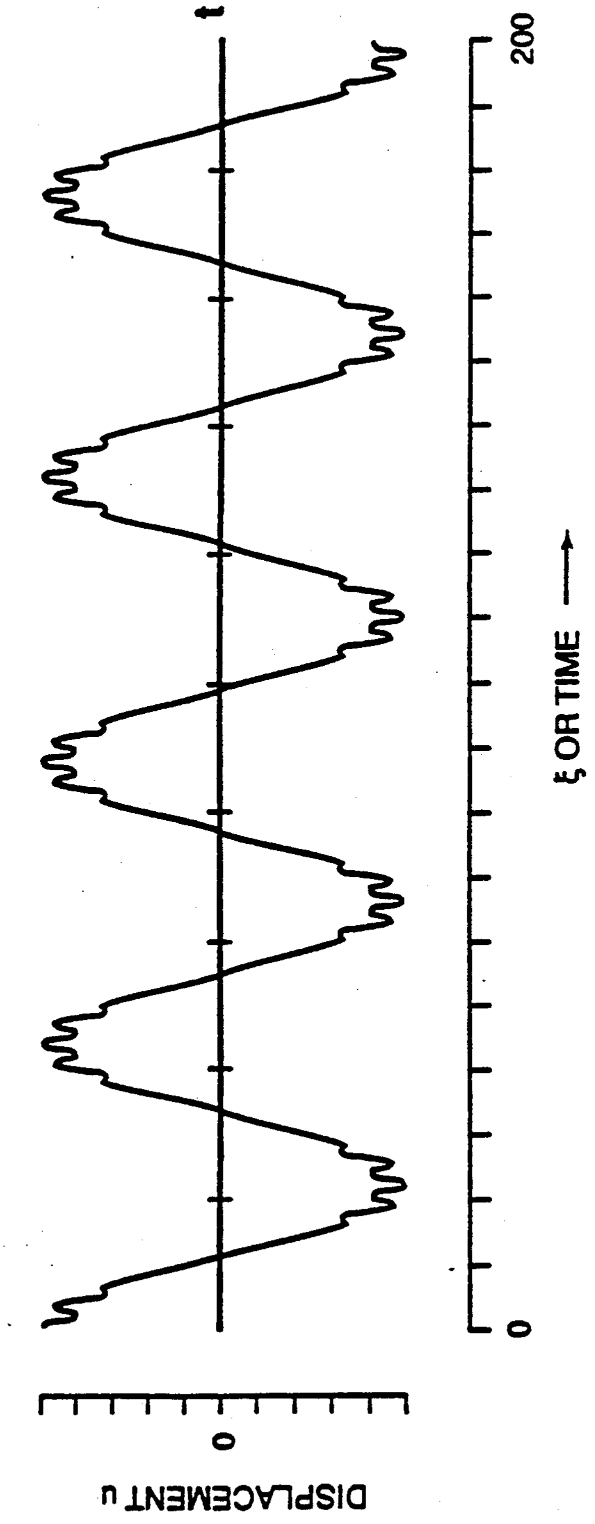
FIG. 6 shows ion trajectories for $\xi=0$ to 200 at $q=0.2$
Figure 7:
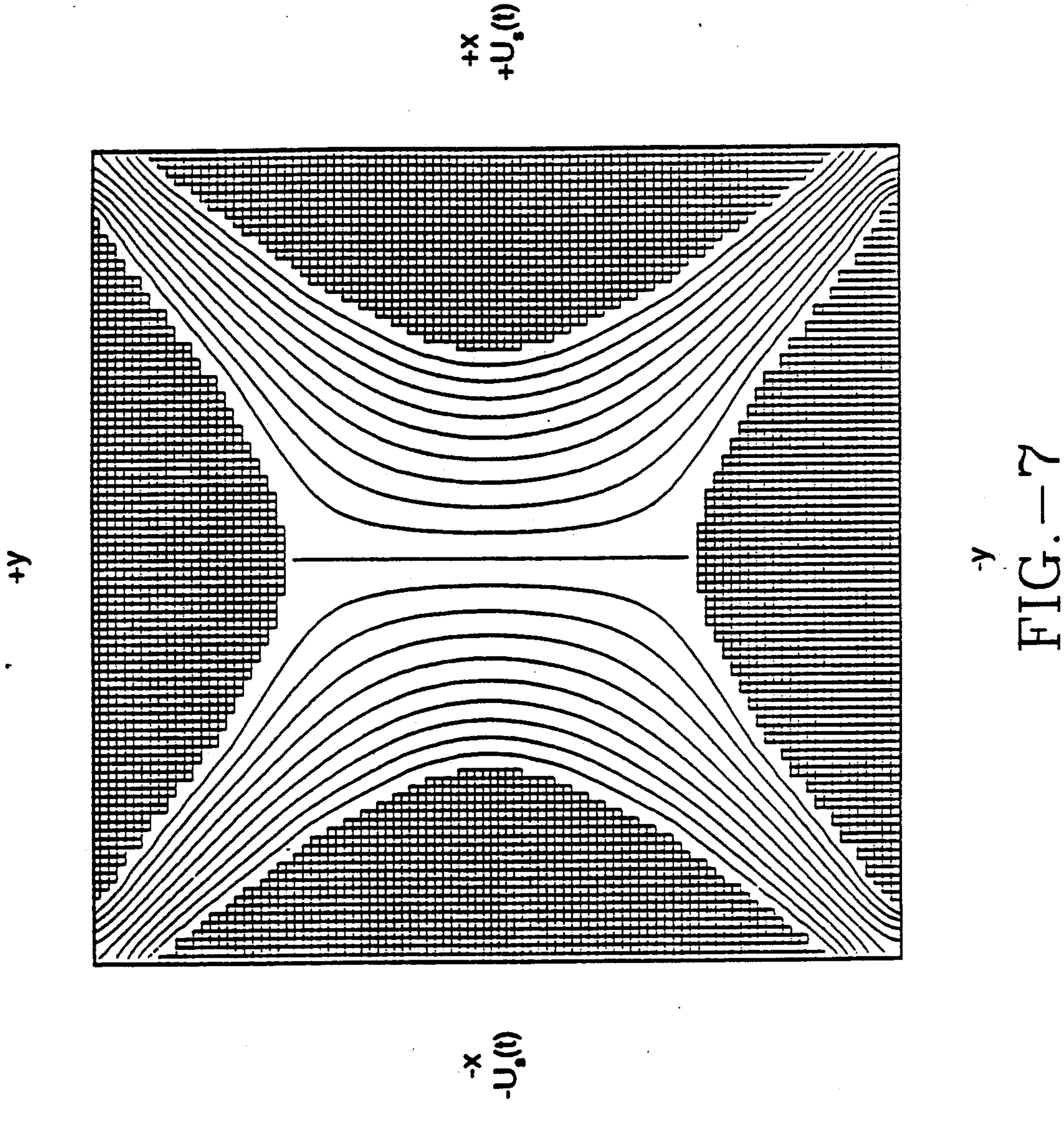
FIG. 7 shows the curvature of equipotential lines in a hyperbolic transverse field resulting from higher order terms.

Pursuant to this invention, many of the drawbacks encountered in prior r.f.-only quadrupole systems can be avoided if an alternative method is used to provide the high $q_x$ cutoff. Ions near the high q stability limit are selectively excited by application of a dipole or quadrupole auxiliary field. In this case, ions in near-resonance with the excitation field will gain transverse kinetic energy and be rejected if their radial displacement exceeds $r_0$ in less than the time it takes them to traverse the length of the quadrupole structure. Such a resonance produces a notch in the transmission band that can eclipse the normal high $q_x$ cutoff. This results in a more abrupt transition between ion transmission and no ion transmission. This resonance induced cutoff in transmission occurs at a $q_x$ slightly lower than that of the conventional stability limit. When such a resonance induced cutoff is utilized during a r.f. only mass analysis scan, the observed detected ion current stair steps have steeper transitions than would be otherwise observed. This results in a derived mass spectrum having improved mass resolution. It is thought that the observed resolution improvement is realized due to the high dispersion in ion characteristic frequencies at high $q_x$. As stated earlier, at high $q_x$, a relatively large change in ion characteristic frequency, expressed as a large change in $\beta_x$ and $\beta_y$, translates to a small change in $q_x$ and, therefore, for a given r.f. field magnitude, a small change in ion mass. The influence of the auxiliary field on ion motion, and hence ion transmission, is strongly dependent upon difference in the resonant frequency of ions and the frequency of the auxiliary field. This results in small differences in ion masses corresponding to large differences in ion transmission.

The chosen auxiliary field frequency can either be the one corresponding to $\beta_u$ or $\beta_u-2$. It has also been demonstrated that it is possible to use the higher frequencies corresponding to $\beta_u+2$ or $\beta_u-4$, however, the AC voltage applied between opposing electrodes needs to have ten times as much amplitude at these higher frequencies to achieve the same effect. There does not appear to be a practical advantage to using these higher frequencies.

Each of the previously mentioned r.f.-only operating modes would benefit by use of a resonance enhanced high $q_x$ ion transmission cutoff. A further improvement is realized by modulation of the $q_x$ corresponding to this resonance enhanced cutoff by modulation of the frequency of the auxiliary field (FM). In this method the frequency of the auxiliary field is varied periodically. The maximum deviation of the auxiliary field frequency, referred to as the magnitude of the frequency modulation, is a very small percentage of the auxiliary field average frequency. The rate of change of the auxiliary field frequency, as determined by the modulation frequency, is always sufficiently slow such that the auxiliary field frequency is effectively constant during an ion's transit though the mass filter. Variation in the auxiliary field frequency, $\alpha$, results in a corresponding variation in the $\beta_x$ or $\beta_y$ which will be resonant. This results in a variation in the effective high $q_x$ cutoff; therefore, for a given r.f. field magnitude, the maximum ion mass for which ion transit will be allowed is lowered. The detected ion current carried by ion masses which have effective path stability altered by the changing frequency of the auxiliary field will have an AC component that has a fundamental frequency the same as the modulation frequency of the auxiliary field. As with the previously described modulation methods the detected ion current signal encoded with the modulation frequency of auxiliary field frequency is isolated and demodulated using phase sensitive detection. Mass resolution is a function of the magnitude of the frequency modulation, as this directly determines the range of ion masses that will produce encoded ion current signals.

Amplitude modulation may also be used to vary the effect of the notch. By turning the supplementary resonance excitation field on and off at a frequency which is low compared to the ion transit time, the ion signal may be modulated. This method has lower resolution compared to frequency modulation due to the width of the notch. The only advantage to amplitude modulation is the lower radial dispersion of the ions which pass through the quadrupole while the resonance field is off. These ions are therefore more easily focused into subsequent ion optical devices.

This new modulation method has distinct advantages over the previously described methods. The anomalous peaks found with the other modulation schemes are avoided since only ions with a $\beta_x$ close to the $\beta_x$ resonant with the auxiliary field produce encoded detected ion currents.

Proper choice of the orientation, magnitude, frequency and the phase of the auxiliary field is necessary for this method to be useful. The determination of the magnitude and frequency of the auxiliary field is a straight foreword empirical process of optimization. Such factors as quadrupole length, r.f. frequency, ion axial kinetic energy, and desired mass resolution as well as ion mass-to-charge ratio will determine the optimal choice for these parameters.

It has been determined that it is necessary for the auxiliary field to cause ion resonance equally in both the x and y dimensions in order for this method to work. The simplest auxiliary field that will work properly is one generated by applying the same differential AC voltage between the x electrodes, as is applied between the y electrodes.

Figure 8:
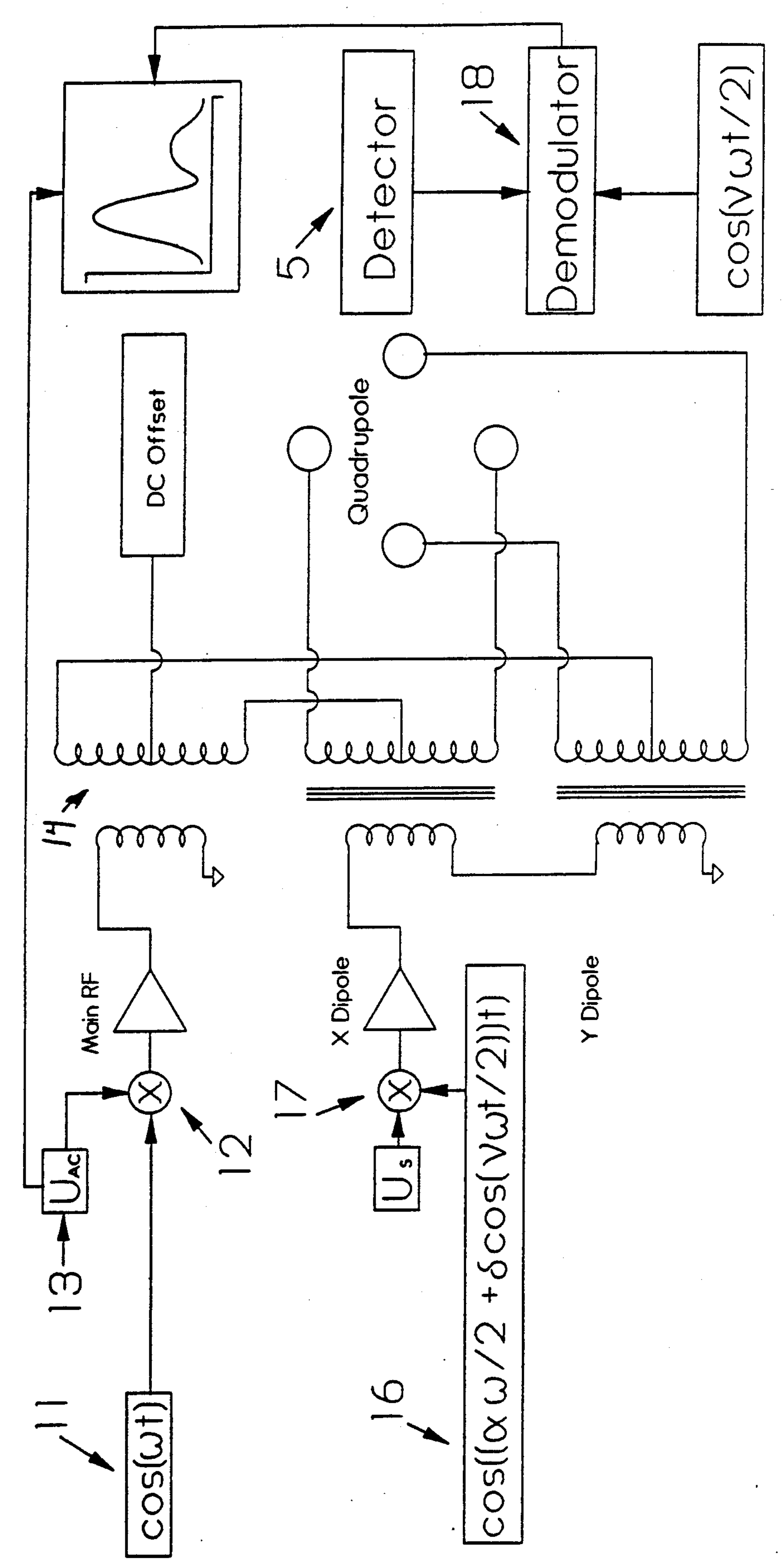
FIG. 8 is a schematic diagram for an r.f.-only mass spectrometer system which excites both x and y dimensions.

Referring to FIG. 8, the r.f. voltage 11 applied to the quadrupole electrodes is a cosine voltage waveform at frequency $\omega$. The amplitude of the voltage is set by multiplying it in multiplier 12 with a control voltage Uac 13. The voltage is coupled to the electrodes by a transformer 14. The auxiliary voltage 16 at frequency $\alpha\omega/2$ is audio modulated at the frequency $\nu\omega/2$ and applied to multiplier 17 where its amplitude is controlled by $U_s$. The output of the detector 5 is applied to a phase sensitive detector 18 which demodulates the output and provides a signal representing a given mass.

Equations (23) and (24) are mathematical representation of the differential voltage applied between the x electrodes, $U_{s,x}(\xi)$, and the differential voltage applied between the y electrodes, $U_{s,y}(\xi)$, in units of normalized frequency and time.

$$U_{s,x}(\xi)=U_s\cos(\alpha\xi-\theta_\alpha) \quad (23)$$

$$U_{s,y}(\xi)=U_s\cos(\alpha\xi-\theta_\alpha) \quad (24)$$

These voltages have common amplitude, $U_s$, frequency, $\alpha$, and phase, $\theta_\alpha$. As described above, the frequency of these voltages is modulated in order to modulate the effective stability limit of the device and thus encode ion current signals. Equation (25) provides a mathematical description of this frequency modulation expressed in normalized frequency and time units.

$$\alpha=\alpha_o+\delta\cos(\nu\xi) \quad (25)$$

In equation (25), $\alpha_o$ represents the average auxiliary field frequency, $\delta$ represents the magnitude of its frequency modulation, and $\nu$ represents its modulation frequency. This produces encoded ac ion current signals which have a fundamental frequency of $\nu$. These normalized frequencies can be converted to true frequencies simply by multiplying them by one half the quadrupole field frequency, f/2 or $\omega/2$.

The application of these two voltages establishes a dipole field oriented at 45 degrees in the xy plane. However if one were to apply only one of these voltages and thus generate a dipole field oriented at 0 or 90 degrees in the xy plane one would observe anomalous instability of the effective stability limit of the quadrupole that is not associated with the frequency modulation. If the frequency modulation is turned off, this instability would appear as a periodic shifting of the stability limit. The period of this shifting would correspond to the frequency $2(1-\alpha)$. To understand the origin of this shifting it is necessary to take a closer look at the character and the phase relationship between ion motion in the x and y dimensions for ions near the $\beta_u=1$ stability limit. Consider first ion motion in the absence of an auxiliary field. As mentioned above, at high $\beta_u$, ion motion is primary comprised of two components which are nearly equal in magnitude and which have frequencies $\beta_u$ and $-2+\beta_u$. A good approximation of an ion's trajectory can be made by considering only these two components of motion and neglecting all others. Equations (26) and (27) use such an approximation to represent the x and y trajectories of any ion at high $\beta_x$.

$$x(\xi)\simeq A_x\left[\cos\left(\beta_x\left(\xi-\frac{\pi}{2}\right)\right)-\cos\left((-2+\beta_x)\left(\xi-\frac{\pi}{2}\right)\right)\right]+B_x\left[\sin\left(\beta_x\left(\xi-\frac{\pi}{2}\right)\right)-\sin\left((-2+\beta_x)\left(\xi-\frac{\pi}{2}\right)\right)\right] \quad (26)$$

$$y(\xi)\simeq A_y\left[\cos(\beta_x\xi)-\cos((-2+\beta_x)\xi)\right]+B_y\left[\sin(\beta_x\xi)-\sin((-2+\beta_x)\xi)\right] \quad (27)$$

The coefficients $C_{-2}$ and $C_0$ are absent in these equations because, at high $\beta_u$, $C_0\approx C_{-2}$ and by choice $C_0=1$. The constants $A_x$, $B_x$ and $A_y$, $B_y$ are determined by the initial transverse displacement and velocity of the ion upon entry of the quadrupole. These equations are written so as to take into account the 180 degree phase shift in the action of the main quadrupole field in the x and y dimensions. This results in the $\pi/2$ term in the x trajectory. Using well known trigonometric identities these equations can be reformulated as shown in equations (28) and (29).

$$x(\xi)\simeq R_x\cos((1-\beta_x)\xi-\theta_y)\cos(\xi) \quad (28)$$

where $R_x=-2\sqrt{A_x^2+B_x^2}$ and $$\theta_x=\arctan\left(\frac{-A_x}{-B_x}\right)-(1-\beta_x)\frac{\pi}{2}$$

$$y(\xi)\simeq R_y\cos((1-\beta_x)\xi+\theta_y)\sin(\xi) \quad (29)$$

where $R_y=2\sqrt{A_y^2+B_y^2}$ and

-continued $$\theta_y = \arctan\left(\frac{-A_y}{-B_y}\right)$$

Inspection of these recast x and y trajectory equations provides insight into the origin of the problem. These trajectory equations clearly show the ion motion as an oscillation having a frequency of exactly half the main field frequency, 1 in normalized frequency units, having a sinusoidally varying amplitude. This period of this amplitude variation or beats is determined by the frequency $1-\beta_x$. The phase of this oscillation is independent of the ion's entry displacement and velocity. Since the oscillation frequency is exactly half of the r.f. frequency, there is a fixed phase relationship between the ions oscillatory motion and the r.f. field. Furthermore x oscillation is always 90 degrees out of phase with the y oscillation. The oscillation in the x and y dimensions are thus in quadrature.

When ions are subjected to an auxiliary field having frequency of nearly half the r.f. frequency, the fixed phase relationship between x dimension motion, y dimension motion and the r.f. quadrupole field have important consequences. In this circumstance the flight time of an ion through the mass filter is so short that the frequency of the auxiliary field, $\alpha$, is indistinguishable from the frequency of ion oscillation, which is 1 or f/2 in non-normalized units. The frequency difference is manifested in a shifting in the relative phase of the auxiliary field and the phase of ion motion, as determined by the r.f. field phase, for ions entering the quadrupole at different times. If the auxiliary field and the natural oscillation of the ion are in phase, then the amplitude of the ion's oscillation resonantly increases. If the auxiliary field and the natural oscillation of the ion are in quadrature, then there is no resonant coupling and the ion's motion is unaffected by the auxiliary field.

In the case where the auxiliary field is oriented so as to cause resonance in a single dimension of motion, this periodic variation of the coupling of the auxiliary field to the motion of ions in transit results in the observed modulation of the effective stability limit of the mass filter. In the case where the auxiliary field is oriented so as to excite resonance equally in each dimension, the quadrature phase relationship in the natural motion in the x and y dimension results in no modulation of quadrupole stability limit. When the auxiliary field is in quadrature with ion motion in one dimension, it is in phase with ion motion the other dimension. The rate of ion radial displacement growth from the quadrupole's central axis is therefore time invariant.

It is conceivable that the periodic shifting of the stability limit associated with auxiliary fields acting in a single dimension or unevenly in both dimensions could be used in a simple scheme to provide the ion beam modulation. In such a scheme, modulation of the auxiliary field frequency is not needed because the phase sensitive detector can be tuned to monitor the stability limit shift frequency. Adjustment of mass resolution can then be achieved by controlling the magnitude and frequency of the auxiliary field. However, because the required mass resolution as well as ion transit time changes as a function of ion mass, the auxiliary field frequency must be adjusted during the mass scan. This would result in change in the frequency of the stability limit shifting and therefore the encoding frequency of the ac ion current signal. The detection system will need to track these changes. Furthermore the frequency modulation schemes offer much finer control of the range of $q_x$s which will be subject to modulated effective stability. This directly translates into improved mass resolution.

There are alternative auxiliary field configurations that will also avoid unwanted modulation of the effective stability limit of the mass filter. One such field is produced by applying the differential voltages $U_{s,x}(\xi)$ and $U_{s,y}(\xi)$ as shown in equations (30) and (31).

$$U_{s,x}(\xi) = U_s \cos(\hat{\alpha} - \theta\alpha) \cos(\xi) \quad (30)$$

$$U_{s,y}(\xi) = U_s \sin(\hat{\alpha} - \theta\alpha) \sin(\xi) \quad (31)$$

As represented in equations (30) and (31), these voltages are essentially products of two sinusoidal terms. The second term varies at one-half the r.f. frequency and is phased so as to match the phase of ion motion in the corresponding dimension. The first term in each equation varies at a frequency $\hat{\alpha}$, which is very small relative to the frequency of r.f. The term having the frequency $\hat{\alpha}$ in the expression for $U_{s,x}(\xi)$ is fixed in quadrature with the corresponding term in the expression for $U_{s,y}(\xi)$. However, the phase $\theta\hat{\alpha}$ of these low frequency terms may be chosen arbitrarily. These expressions can be reformulated and represented as the sum of two sinusoidal terms having frequencies $1-\hat{\alpha}$ and $1+\hat{\alpha}$. Thus applying such voltages produces two auxiliary dipole fields having frequencies $1-\hat{\alpha}$ and $1+\hat{\alpha}$. An ion with $\beta_x = 1-\hat{\alpha}$ will be simultaneously resonant with both of these fields since the two component frequencies of these fields match the two main resonant frequencies of the ion. If considered independently, these auxiliary fields are oriented at a 45 degree angle in the xy plane. Thus there is no unwanted modulation of the resulting resonance enhanced stability limit. Modulation of the effective stability limit is accomplished by modulation of the frequency $\hat{\alpha}$ as is shown in equation (32). In equation (32) $\hat{\alpha}_0$ represents the average frequency, $\delta$ represents the magnitude of its frequency modulation, and $\nu$ represents its modulation frequency. This method is in every way equivalent to the previously described method except that it has the advantage that the frequency modulation can be done at a relatively low frequency which simplifies design of the electronics necessary for the generation of the auxiliary voltages $U_{s,x}(\xi)$ and $U_{s,y}(\xi)$.

$$\hat{\alpha} = \hat{\alpha}_0 + \delta \cos(\nu\xi) \quad (32)$$

The factors having the frequency of exactly $\omega/2$ with appropriate quadrature phasing can be easily derived from the source fundamental r.f. frequency. The low frequency component, $\hat{\alpha}$, is an audio frequency that is easily adjusted and frequency modulated to track the optimal ion resonant frequency, $\beta_x$, and modulation amplitude $\delta$ to analyze a specified mass range and with a desired resolution. This is the preferred method for applying modulated resonance excitation at high $\beta_x$.

Figure 9:
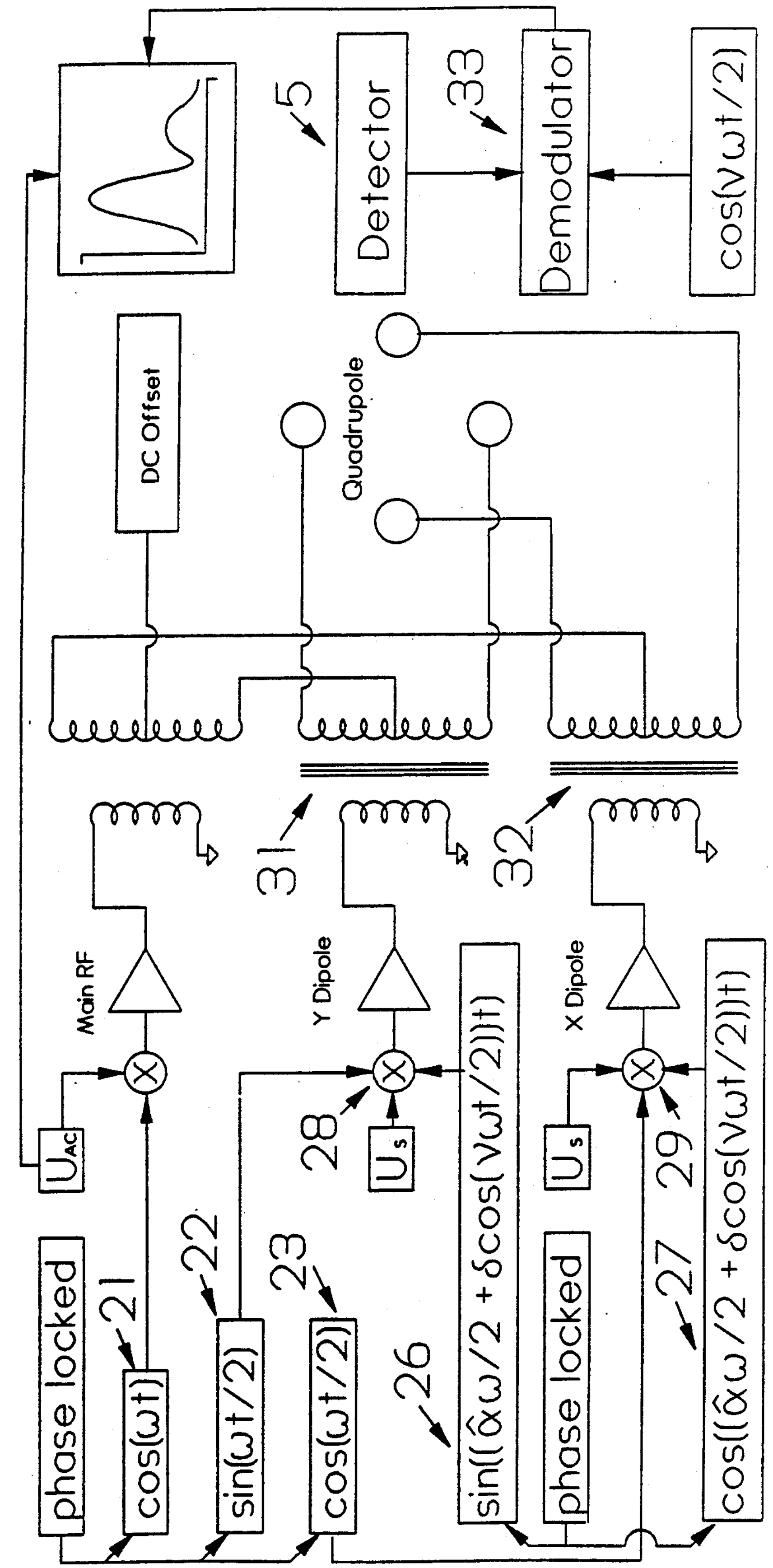
FIG. 9 is a schematic diagram for an r.f.-only mass spectrometer system which uses double sideband resonance in both the x and y dimensions.

A simplified block diagram for a suitable mass spectrometer system is shown in FIG. 9. In this system the main r.f. voltage 21 is derived from a cosine voltage waveform of frequency $\omega$. The amplitude of this cosine voltage is set by mixing or multiplying it with a control voltage $U_{ac}$. The chosen amplitude determines the high mass cutoff in a normal r.f.-only system. Two additional waveform generators 22 and 23 which produce quadrature (cos and sin) outputs have the frequency of $\omega/2$. These waveforms are appropriately phase-locked to cos ($\omega$t) and can be derived from $\omega$ by using a frequency divider. Two audio waveform generators 26 and 27 produce quadrature sinusoidal outputs having the same frequency $\alpha\omega/2$. The $\omega/2$ waveforms are mixed or multiplied 28, 29 by appropriate audio frequency waveforms. This double sideband/suppressed carrier (DSSC), or full-wave modulation, creates a voltage waveform composed of the needed auxiliary field frequencies of $\frac{1}{2}\omega\pm(1-\hat{\alpha})\frac{1}{2}\omega$. These two frequencies select the resonant $\beta_x$. The amplitude of these voltage waveforms is set to $U_s$ and then inductively coupled to the appropriate x and y pairs of rods by well insulated ferrite transformers 31, 32. All that remains is to modulate the position or $\beta_x$ at which resonance occurs, which is accomplished by frequency modulation of the audio frequency generators. The amplitude of the auxiliary voltage, $U_s$, the chosen average $\beta_x$ at which resonance occurs, and the amplitude of the auxiliary field frequency modulation, $\delta$, determines the resolution setting of a given device. The modulation frequency, $\nu\omega$, is chosen to be slow relative to the ion transit time through the quadrupole. The detected output signal is demodulated by demodulator 33 connected to receive the signal from detector 5 and from the audio voltage source 27.

Figure 10:
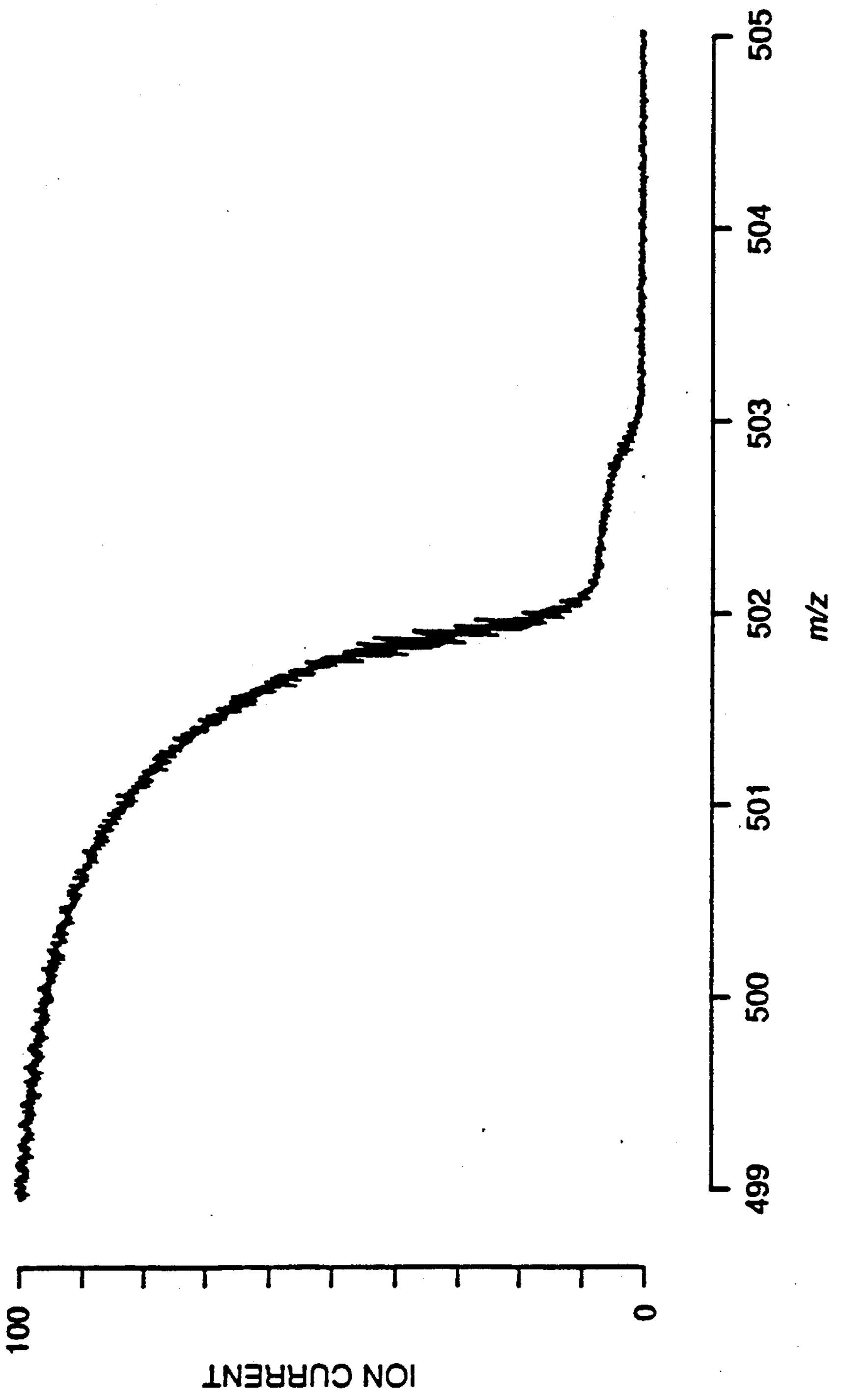
FIG. 10 shows the stairstep output in an r.f.-only scan of m/z 502.
Figure 11:
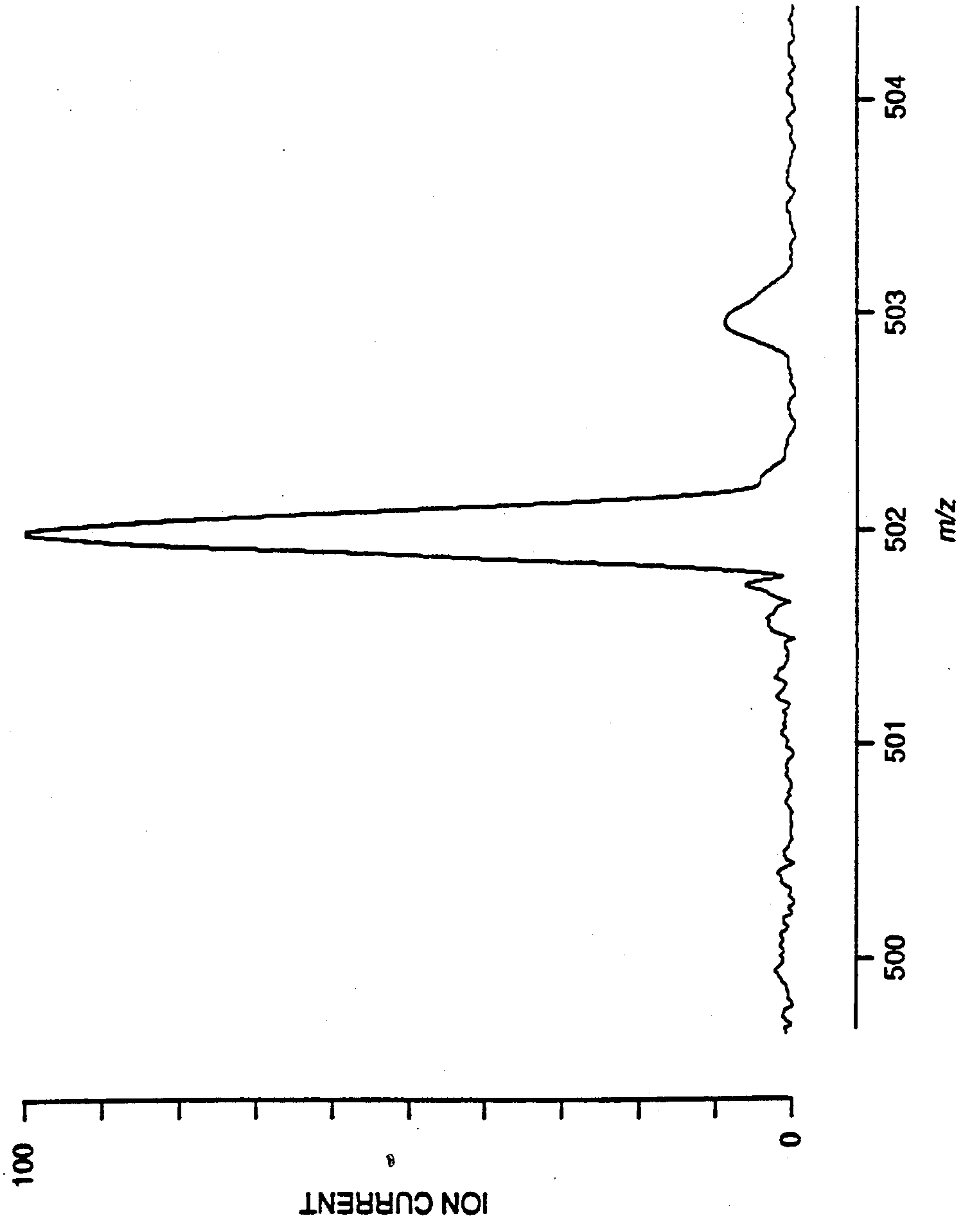
FIG. 11 shows demodulation of the AC signal in the stairstep at m/z 502.

The success of this technique can be seen in FIGS. 10 and 11. FIG. 10 shows the detected ion current stairstep obtained during a 1.0 second scan of the range of r.f. voltage that corresponds to the transition of the ion mass 502 from stability to instability. The modulation of the auxiliary field frequency results in the observed ac ion current signal component that appears coincident with the stair step ion current transition. In this experiment the r.f. field frequency was 1002000 Hz. The ion's resonance frequencies were at 494800 Hz, which corresponds to $\beta_x=0.9876$. The auxiliary field was modulated across a frequency range of 1000 Hz (FM amplitude) with a rate of change or modulation frequency of 1200 Hz (FM frequency). FIG. 11 shows the ion current signal after application of phase sensitive detection. This signal represents the mass peak associated with the mass 502 from electron impact ionization of perfluorotributylamine. This filtering and demodulation that constitutes phase sensitive detection is accomplished digitally. In this example phase sensitive detection is set to respond to ion current signals within the frequency band from 1170 Hz to 1230 Hz which permits the mass peak shape to be properly represented.

Figure 12:
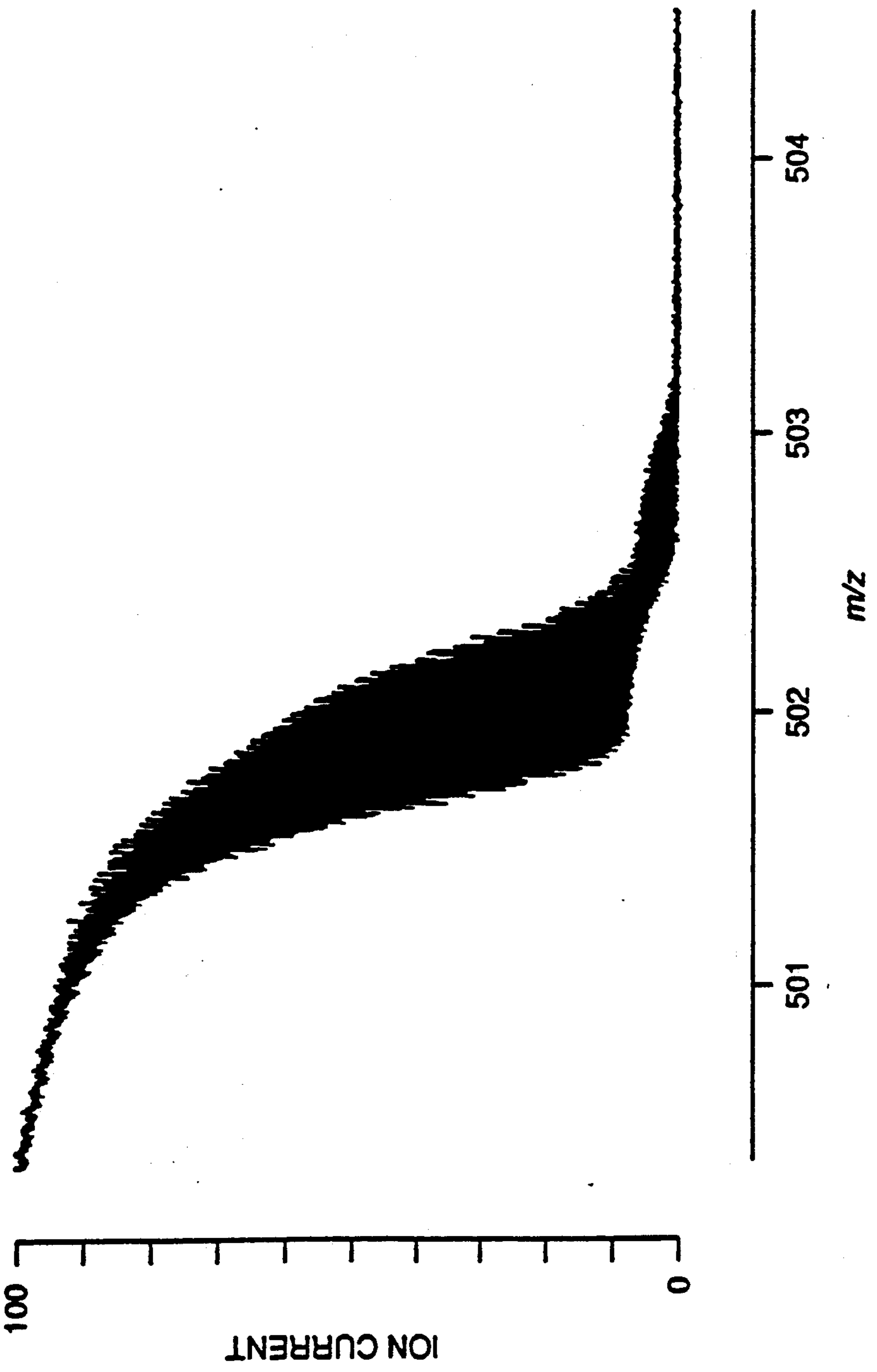
FIG. 12 shows stairstep output with large resonance modulation at m/z 502.
Figure 13:
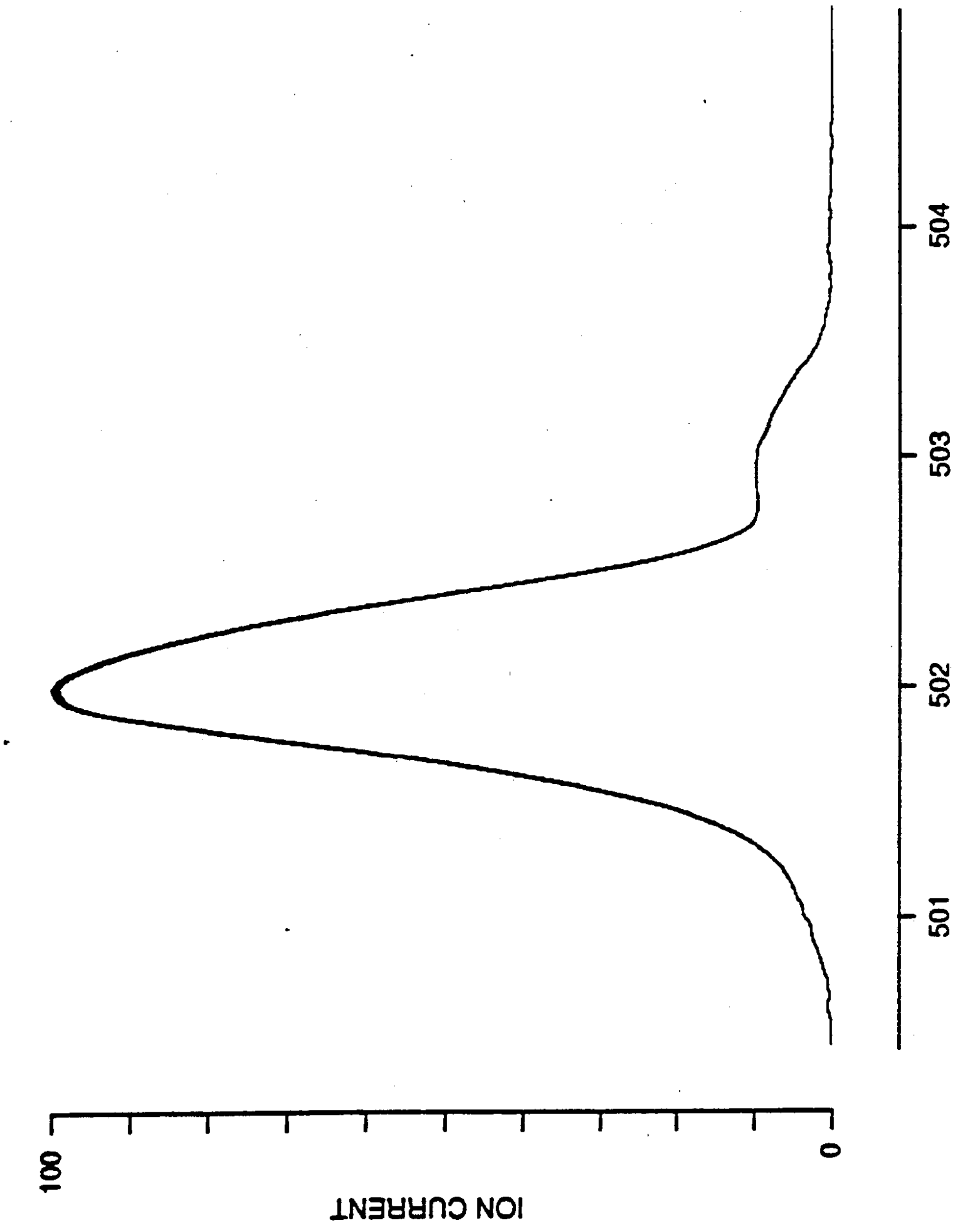
FIG. 13 shows how demodulation of a large resonance modulation as in FIG. 12 reveals lower resolution with greater sensitivity.
Figure 14:
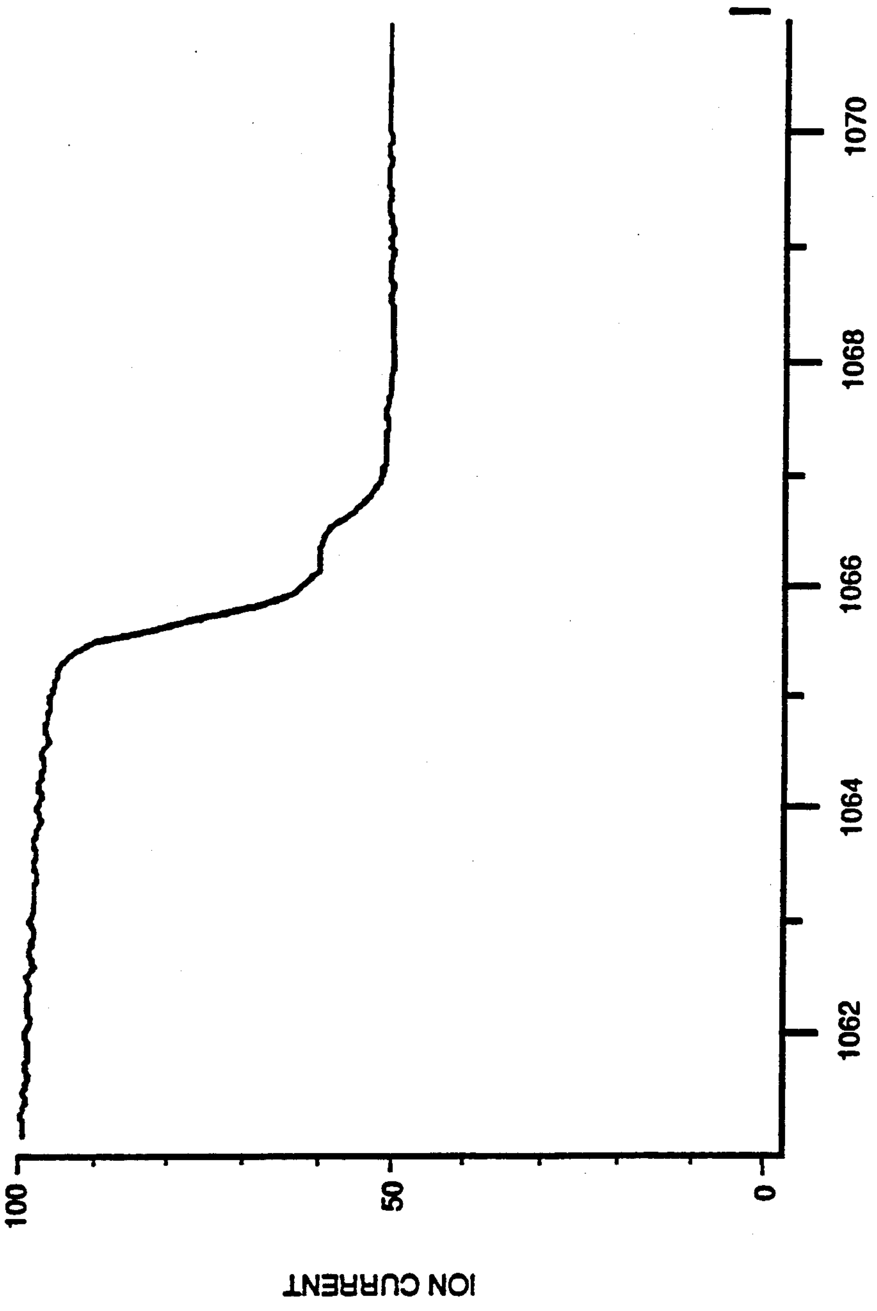
FIG. 14 shows r.f.-only step output for Mass 1066.
Figure 15:
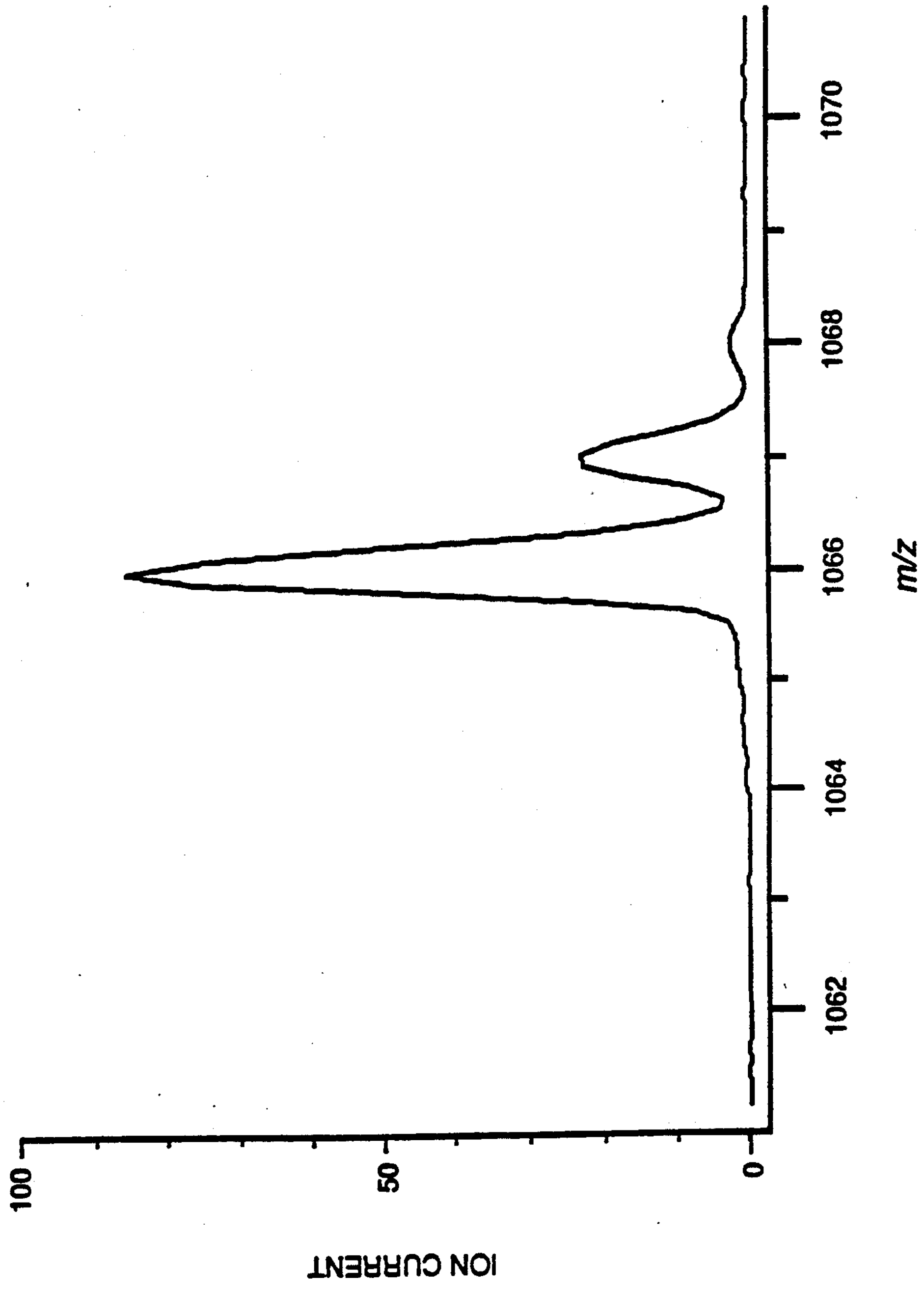
FIG. 15 shows how demodulation of the stairstep of FIG. 14 obtains well-resolved peaks for Mass 1066.

By changing the parameters of the resonance excitation, the sensitivity and resolution can be adjusted. FIG. 12 shows the effect of resonance excitation at $\beta_x=0.98$ with an FM amplitude of 6100 Hz at the same FM frequency of 1200 Hz. Demodulation yields the peaks shown in FIG. 13. Results are also shown for mass 1066 from perfluorononyltriazine in FIGS. 14 and 15.

The described mass analysis methods using modulated resonance excitation are also applicable to tandem quadrupole instruments used for MS/MS analysis such as the quadrupole system described by Enke et al., U.S. Pat. No. 4,234,791. The first quadrupole (Q1) is operated such that the ion current carried by the parent ion of interest is modulated at a frequency $f_1$. Ions of this selected mass and all ions of higher mass enter the second quadrupole (Q2) which is operated at an elevated gas pressure to produce collision induced dissociation (CID). All daughters of all ions that pass Q1 then enter the third quadrupole (Q3) but only the portion of the ion current carried by the daughters of the selected parent ion mass is encoded with the Q1 modulation frequency, $f_1$. Q3 is also operated in a modulated resonance excitation mode, but with a modulation frequency $f_2$ different from that of Q1. The ac components of the detected ion current having frequencies $f_1+f_2$ and $f_1-f_2$ represent the daughter ion current originally carried by the ions having the ion mass selected in Q1. Thus monitoring either or both of these frequencies detects only the daughters of a specified parent.

Figure 16:
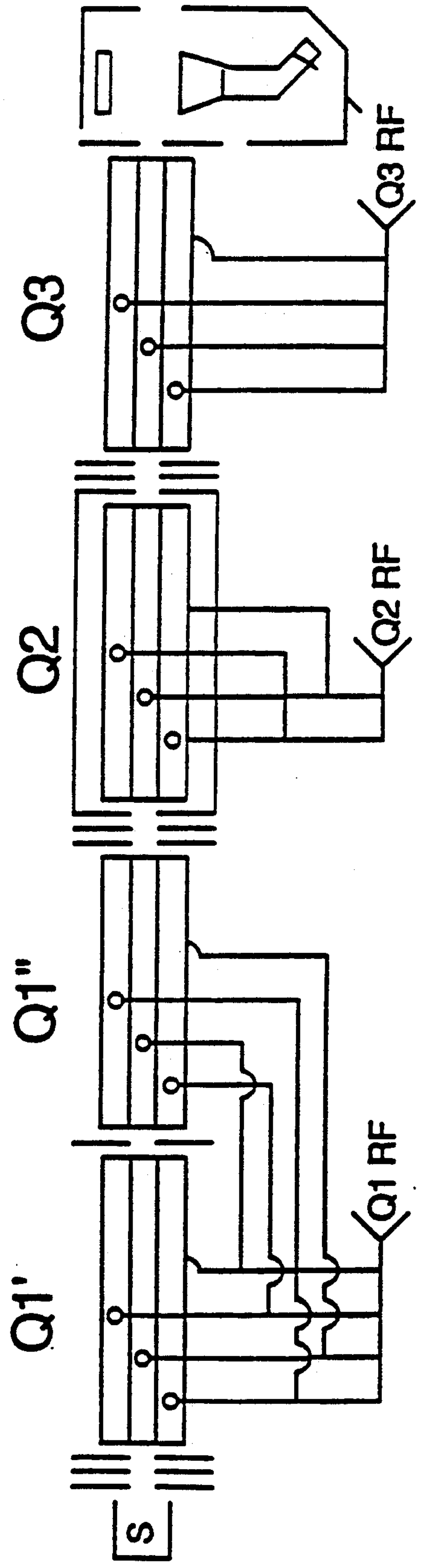
FIG. 16 is a schematic diagram of a tandem r.f.-only quadrupole mass spectrometer.

Straightforward application of modulated resonance excitation to MS/MS reveals a problem. The auxiliary field alters the ion trajectories resulting in increased radial displacements and velocities, making the ion beam unsuitable for efficient transfer to subsequent ion optical devices, such as a lens or a multipole collision cell. One solution is to use amplitude modulation instead of frequency modulation to encode the signal from Q1. Another solution is shown in FIG. 16. Q1 is shown as two sections which can either be separated by a simple aperture or closely spaced without an aperture. The electrical connections cause the excitation field to change phase in both the x and y dimensions by exactly 180°, so any energy gained in the first section is removed by the second section. Only those ions which achieve displacements that exceed either $r_0$ or the optional aperture will be removed. Those which survive will be returned to displacements and velocities at the exit of Q1 similar to those they had upon entry to the quadrupole. The ion beam then passes to the next ion optical element with essentially the same characteristics it had upon entry to Q1'.

Because we have successfully developed a mass analysis system in which the salient parameter is $\beta_x$ we can take advantage of the inverse relationship between mass and $q_x$ at a selected $\beta_x$. A limitation in the design of a quadrupole system is the maximum voltage and frequency that can be practically employed. The addition of the resonance excitation makes ions unstable for a narrow range of $q_x$ at any chosen $q_x$. Excitation at a $\beta_x$ of 0.07 will make ions unstable if they have $q_x$'s within a narrow range of $q_x$ near $q_x\simeq0.1$. Ions will still be unstable if they have $q_x$'s above the normal r.f.-only stability limit of $q_x\simeq0.908$. A modulated resonance excitation method can be implemented to effect mass analysis of ions in transit at any $q_x$ within the stable region. Such a method implemented to perform mass analysis at a $q_x$ of 0.10 would produce a nine-fold extension in the instrument mass range. Therefore, a 3000 amu r.f.-only system of conventional design could be modified to scan to mass 27000.

The techniques incorporating resonance excitation without modulation to extend the mass range of the three dimensional quadrupole mass spectrometer (quadrupole ion trap mass spectrometers) are well established. At low values of q, the ion motion is primarily composed of a single sinusoidal component, therefore, the double sideband operation mode is not advantageous.

Application of an auxiliary field resonant for a $\beta_x$ well less than 1, results in a notch in addition to the step transition in the detected ion current verses $q_x$ curve. When the frequency of the auxiliary field is modulated both the high $q_x$ and the low $q_x$ sides of the notch are shifted at the modulation frequency. Ions in transit having $q_x$ that correspond to either side of the notch produce ion current signal at the modulation frequency.

One solution to this problem is to apply two auxiliary fields having slightly different frequencies. One auxiliary field is oriented to affect ion motion only in the x dimension. The other is oriented so as to affect ion motion only in the y dimension. This produces a composite notch in the ion transmission envelope. The low $q_x$ side of the notch is established by one of the auxiliary fields and the high $q_x$ side of the notch is established by the second auxiliary field. The frequency of one of the auxiliary fields is modulated, resulting in modulation of ion current signal carried by ions have $q_x$'s corresponding to the side of the notch that is modulated.

The composite notch may also be created by establishing the two auxiliary fields so that they act in the same dimension. However, when the frequencies of these fields are close, the auxiliary fields do not independently affect ion transmission. The resulting composite notch in the ion transmission has a shallower slope which produces correspondingly poorer mass resolution when modulated. It is therefore preferable to produce one side of the composite notch with a field acting only in the x dimension and the other side of the notch with an auxiliary field acting only in the y dimension.

Figure 17:
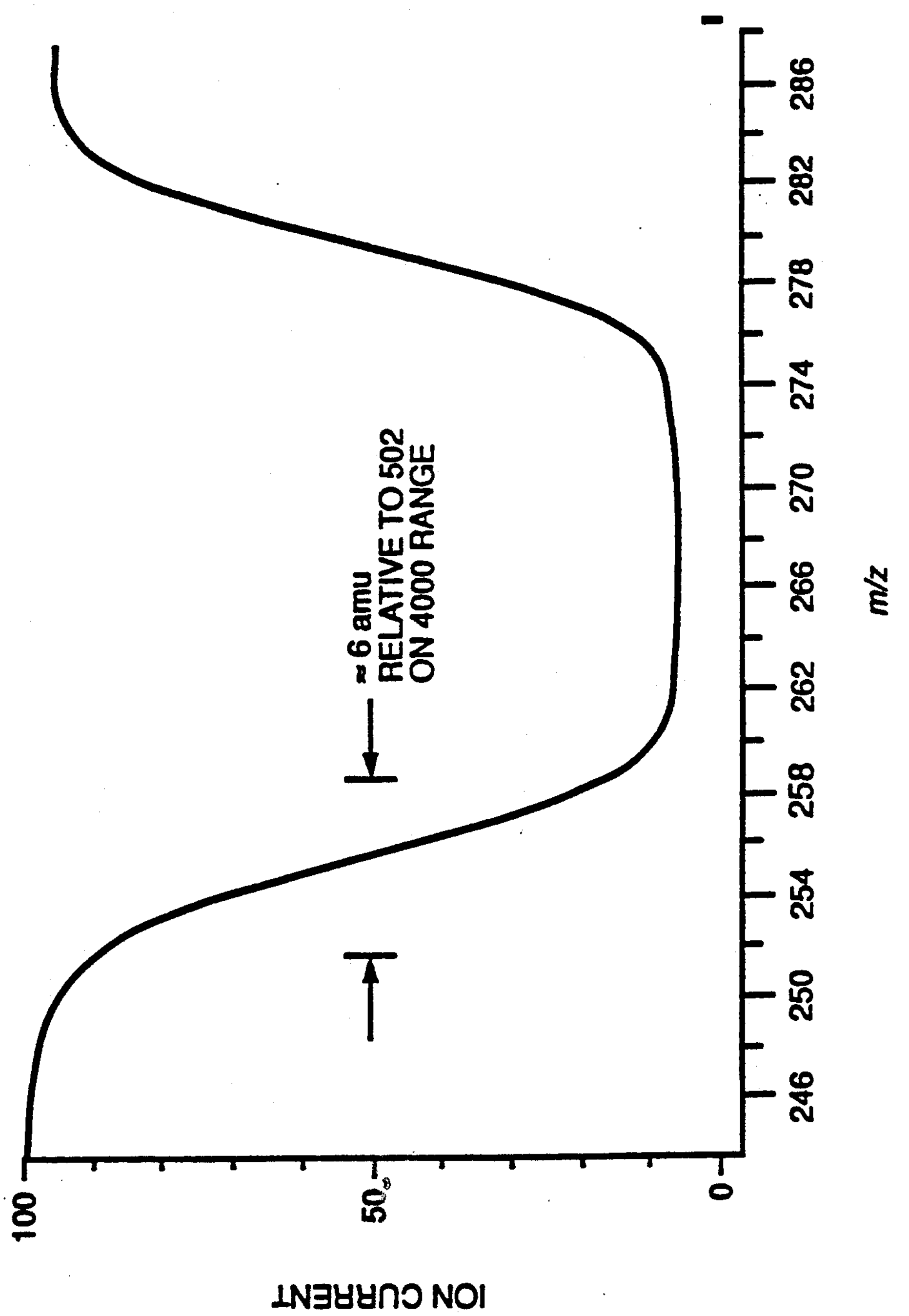
FIG. 17 shows the low $\beta$ notch in a tandem mass spectrometer.

FIG. 17 shows a composite notch with a lower edge at $\beta_x=0.5$, which corresponds to mass 502 when the r.f. amplitude places mass 195 at the q=0.908 cutoff. The mass range of the quadrupole has been doubled. The sides of this composite notch have slopes corresponding to a peak width of 6 amu at the base when the amplitude of the frequency modulation is chosen to provide maximum ion current detection sensitivity. It should be noted that unwanted modulation of the notch position can occur. It is associated with phase relationship of the auxiliary fields with the main quadrupole. It only occurs when the fundamental r.f. frequency and the excitation frequency have whole number relationships.

It is also possible to produce multiple composite notches at different $q_x$s. By using different modulation frequencies, each notch can be simultaneously and independently monitored for true multiple ion detection.

The two opposite sides of a composite notch can also be modulated at different frequencies. The limitation is the actual width of the notches in terms of $\beta_x$ or $q_x$ which restricts the number and spacing of ions that can be monitored. With multiple composite notches it is possible to scan several mass ranges simultaneously by simply scanning the r.f. amplitude.

The use of multiple composite notches in both Q1 and Q3 of a tandem r.f.-only mass spectrometer makes a true multiple reaction monitoring experiment possible in which nothing scans, or in which a scan of Q3 can monitor daughters of multiple parents, or in which a scan of Q1 can monitor parents of multiple daughters.

Figure 18:
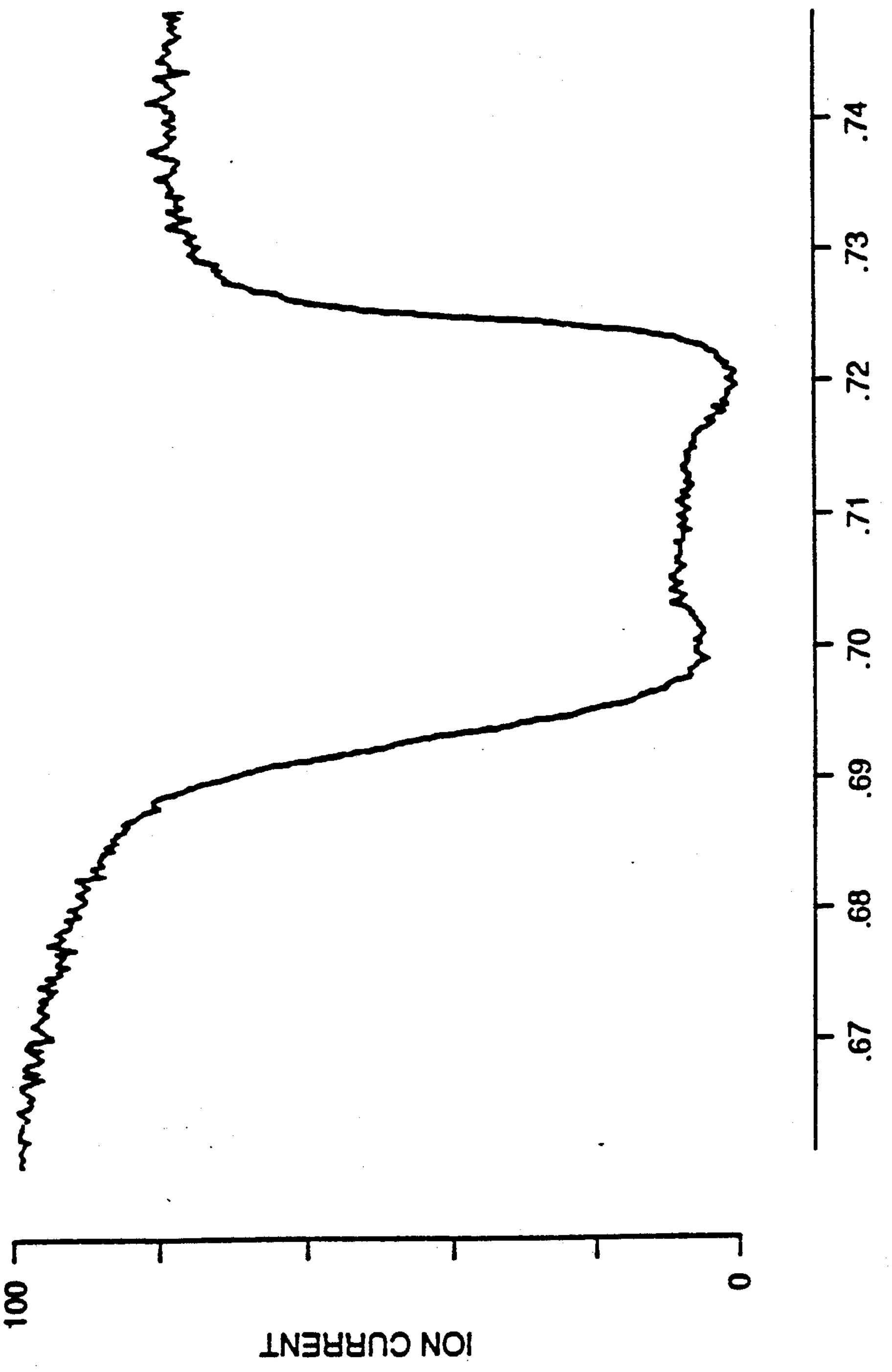
FIG. 18 shows how three excitation frequencies in phase exhibit result in destructive interference.
Figure 19:
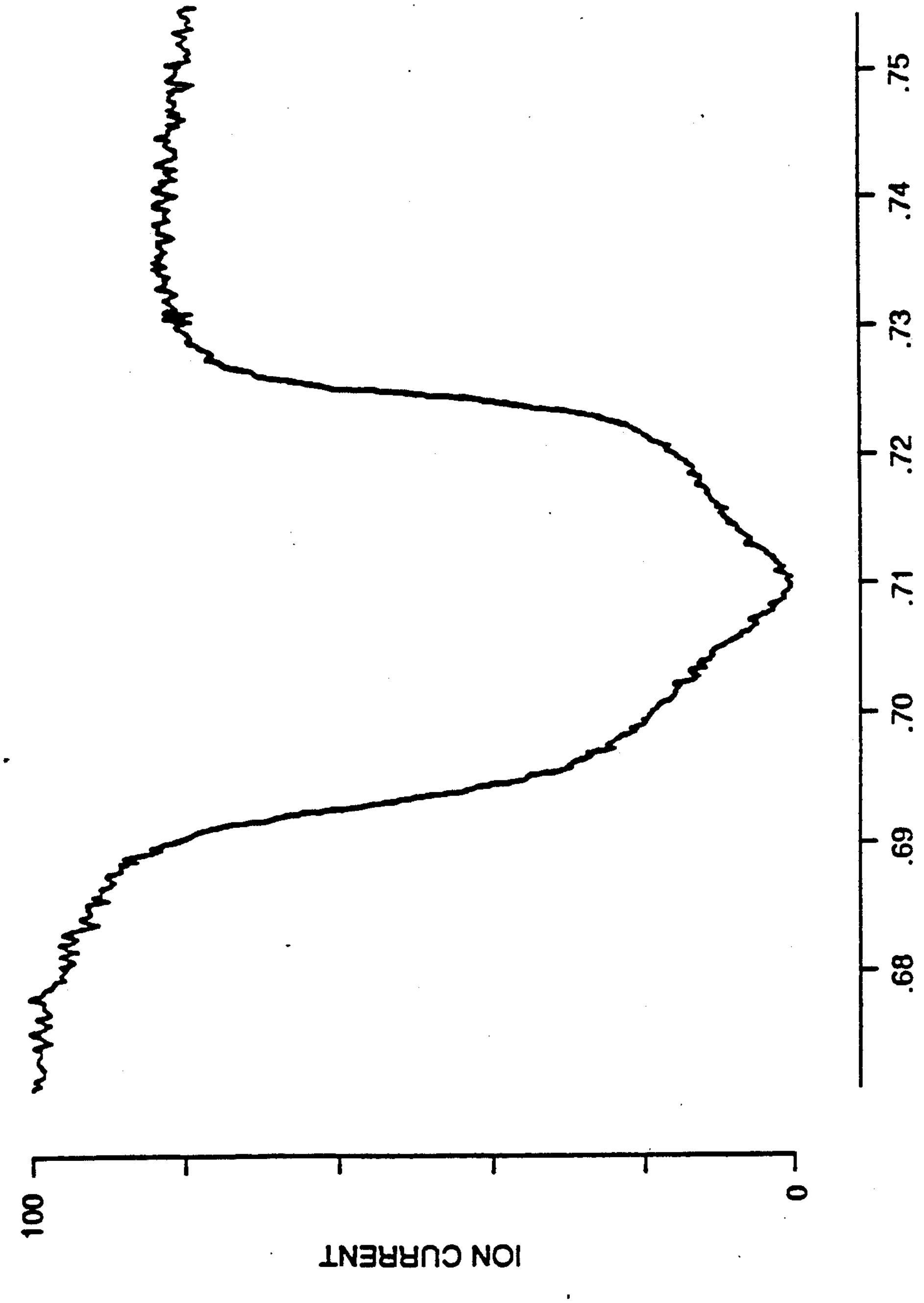
FIG. 19 shows how a 90 degree phase shift of the center frequency allows the center frequency to be reinforced.

Multiple, closely-spaced notches can also be used to provide wide ranges of $q_x$, that reject ion transmission. When implemented in a single dimension, the closely-spaced resonances interact in a surprising way. For example, excitation at three frequencies corresponding to $\beta_x=0.70$, 0.71 and 0.72 produces a wide notch with a bump at the center as seen in FIG. 18. Because the center frequency is the average of the outer two, the effect of the center frequency is periodically reinforced and canceled at a frequency corresponding to the difference frequency between the center frequency and the side frequencies. If the phase of the center frequency is shifted by 90° relative to the phase of the average frequency of the side frequencies, then the presence of the side frequencies can only reinforce the effect of the center frequency. In this case the center of the wide notch is deeper than the edges, as is shown in FIG. 19. For very wide notches, this pattern can be repeated with a series of evenly spaced frequencies, with alternating phase shifts of 90°. There is a limit, however, because the amplitude of the applied auxiliary voltage grows as the number of contributing frequencies increases. At large auxiliary voltage amplitudes, the higher order components of the auxiliary field become significant and produce small notches elsewhere in the transmission band.

Figure 20:
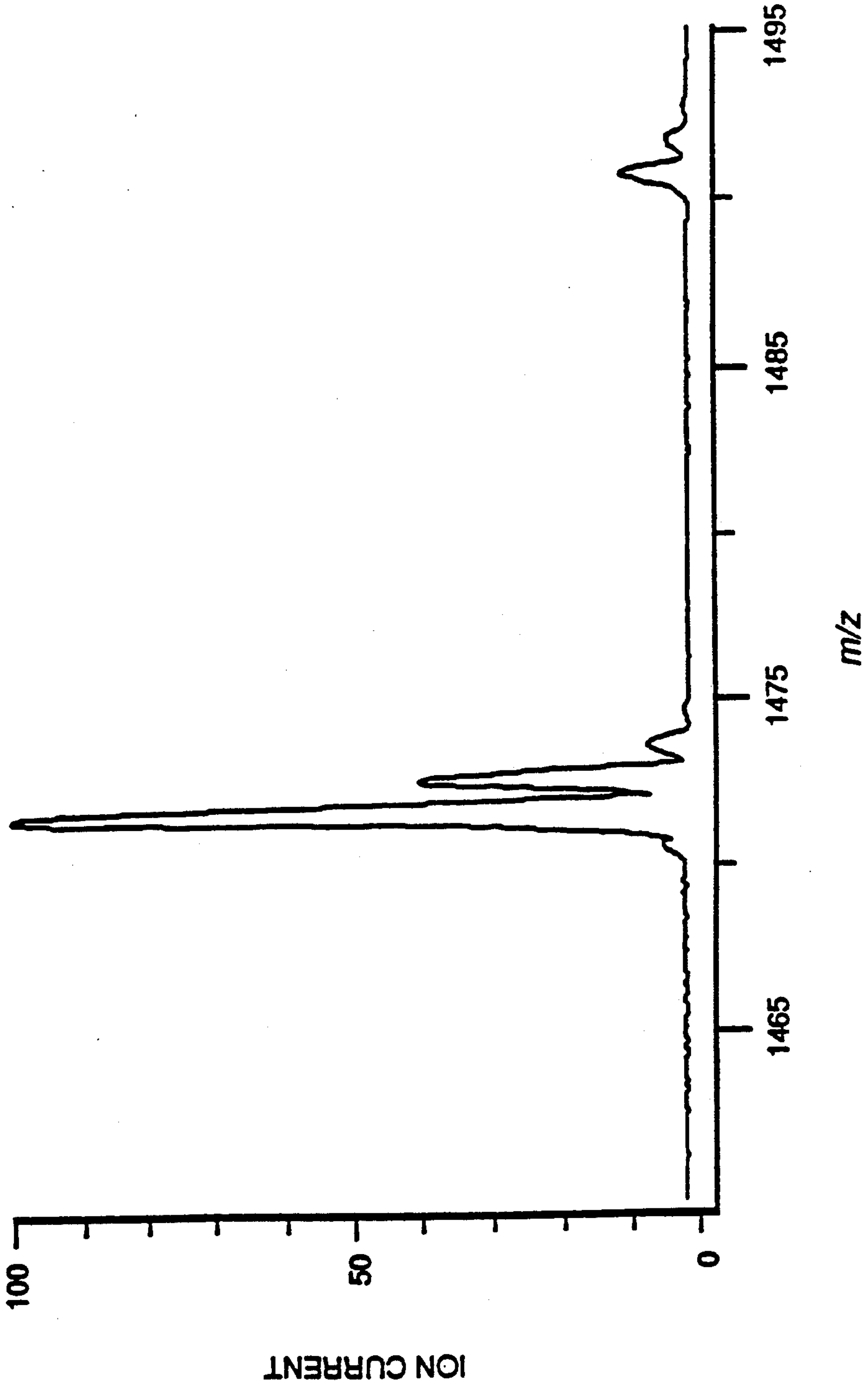
FIG. 20 shows how Mass 1466 and 1485 from PFNT are fully resolved using an r.f.-only quadrupole with improved ion transmission in accordance with the invention.

The most encouraging result is the resolution of mass 1466 using an r.f.-only quadrupole operated at 1,002,000 Hz as seen in FIG. 20. This figure was acquired with a quadrupole which has marginal performance at 1466 u in the normal r.f./DC operation mode. Similar resolution is achieved in the r.f./DC mode only at the expense of sensitivity. By comparison, the r.f.-only mode has more than 50 times as much intensity in terms of ion current at the detector, the signal that contains mass/intensity information. This result clearly demonstrates the projected advantages of increased sensitivity and resolution at high mass.

A robust low mass analyzer is possible using higher r.f. frequencies and fast scan speeds. Such a system could exhibit high sensitivity and stable long term performance with readily achievable specifications using components that do not require ultra precise manufacturing techniques. The absence of DC voltages makes the r.f.-only quadrupole an ideal mass filter for monitoring the products of high energy collisions. The offset may be easily scanned to track the kinetic energy of the daughter ions, which will vary directly with mass due to kinetic energy partitioning in the fragmentation. Charging effects caused by dielectric films on the rods are eliminated.

There are limitations to systems built with this technology. If a wide mass range instrument is required, modulation techniques must be used to achieve unit mass resolution. This limits scan speed, making capillary column GC at unit resolution impractical. Ion kinetic energy is limited by the fundamental frequency which, in a practical case, is set by the power needed to produce a required level of r.f. voltage across a given quadrupole structure and the corresponding voltage limit of that structure. Values of 3 kV at 1 MHz as used in the prototype are reasonable and give a mass range of several thousand Daltons.

What is claimed is:

1. A multipole mass spectrometer apparatus having a plurality of parallel pairs of rod-like electrodes arranged about a longitudinal axis, an ion source near one end of said rod electrodes to project a beam of ions to be analyzed between said rods in the axial direction, and a detector near the other end of said rods to detect ions which are transmitted through said electrodes and generate an output current characterized in that the mass spectrometer includes means for applying an r.f. voltage between rods of said pairs to generate an r.f. field between said rods in which a selected range of ion masses are stable and pass through the rods and other ion masses are rejected by becoming unstable, said region of stability being determined by the r.f. voltage, its amplitude and frequency and represented by an aq stability, and means for applying a supplemental r.f. voltage across said pairs of rods to generate an r.f. field which excites one or more frequencies of the selected ion's natural motion at high $\beta$ whereby to eject selected ions from said rods by resonance instability to provide a sharp transition in the output current.

2. A mass spectrometer apparatus as in claim 1 including means for frequency modulating the supplemental r.f. voltage at a predetermined rate which is slow in comparison to the ion transit time through said rods whereby the output current is modulated at said rate and means for demodulating said output current signal to provide an output at said sharp transition.

3. A mass spectrometer apparatus as in claim 1 including means for amplitude modulating the supplemental r.f. voltage at a predetermined rate which is slow in comparison to the ion transit time through said rods whereby the output current is modulated at said rate and means for demodulating said output current signal to provide an output at said sharp transition.

4. A mass spectrometer apparatus as in claims 1, 2 or 3 in which said supplemental r.f. field is a dipole field.

5. A mass spectrometer as in claim 1 in which the supplemental field interacts with the selected ions' natural motion to produce a modulation in the output signal and means for demodulating said output signal.

6. A mass spectrometer apparatus as in claim 1 wherein said r.f. supplemental voltage includes at least two frequencies to generate r.f. fields.

7. An apparatus as in claim 6 in which the supplemental fields interact with the selected ions' natural motion to produce a modulation in the output signal, and means for processing said output signal.

8. A mass spectrometer apparatus as in claim 6 including means for frequency modulating said supplemental r.f. voltages at a rate which is slow in comparison to the ion transit time through said rods whereby the output current is modulated at said rate, and means for demodulating said output current signal to provide an output at said transition.

9. A mass spectrometer apparatus as in claim 6 including means for amplitude modulating said supplemental r.f. voltages at a rate which is slow in comparison to the ion transit time through said rods whereby the output current is modulated at said rate, and means for demodulating said output current signal to provide an output at said transition.

10. A multipole tandem mass spectrometer apparatus having a plurality of tandem sections, each including a plurality of electrodes arranged about a longitudinal axis, an ion source near one end of the first tandem section to project a beam of ions to be analyzed between said rods in an axial direction, and a detector near the end of the last tandem section to detect ions which are transmitted through said sections and generate an output signal characterized in that the first tandem section includes first and second subsections, means for applying an r.f. voltage between rods of said pairs of each of said sections and subsections in which a selected range of ion masses are stable and pass through the rods of each section while unwanted ions are rejected by becoming unstable, said regions of stability being determined by the amplitude and frequency of the r.f. voltage as represented by the a,q stability, and means for applying a supplemental r.f. voltage modulated at first frequency $f_1$ to said first section with the voltage applied to one subsection having a phase in the x and y dimensions which is exactly 180° with respect to the field in the x and y dimension in the other subsection, introducing a collision gas in one tandem section to produce collision induced dissociation and applying a supplemental r.f. voltage to the next tandem section modulated at a second frequency $f_2$, and detecting ion currents having frequencies $f_1+f_2$ and $f_1-f_2$ which represents the daughter ion current originally carried by the ions selected in the first tandem section.

11. A multipole tandem mass spectrometer apparatus having a plurality of tandem sections, each including a plurality of electrodes arranged about a longitudinal axis, an ion source near one end of the first tandem section to project a beam of ions to be analyzed between said rods in an axial direction, and a detector near the end of the last tandem section to detect ions which are transmitted through said sections and generate an output signal including means for applying an r.f. voltage between rods of said pairs of each of said sections in which a selected range of ion masses are stable and pass through the rods of each section while unwanted ions are rejected by becoming unstable, said regions of stability being determined by the amplitude and frequency of the r.f. voltage as represented by the a,q stability, and means for applying a supplemental r.f. voltage modulated at first frequency $f_1$ to said first section, introducing a collision gas in one tandem section to produce collision induced dissociation, applying a supplemental r.f. voltage to the next tandem section modulated at a second frequency $f_2$, and detecting ion currents having frequencies $f_1+f_2$ and $f_1-f_2$ which represents the daughter ion current originally carried by the ions selected in the first tandem section.

12. The method of improving the operation of a multipole mass spectrometer comprising the steps of applying an r.f. voltage to said multipoles to generate an r.f. field in which a selected range of ion masses are stable and pass through the spectrometer while others are rejected, and applying a supplemental r.f. voltage across pairs of said poles to generate an r.f. field which excites one or more frequencies of the selected ion's natural motion through the spectrometer at a selected $\beta$ to provide a sharp transition in the output.

13. The method as in claim 12 in which the supplemental r.f. voltage is frequency modulated at a rate which is slow in comparison to the ion transit time through the mass spectrometer and demodulating the output.

14. The method as in claim 12 in which the supplemental r.f. voltage is amplitude modulated at a rate which is slow in comparison to the ion transit time through the mass spectrometer and demodulating the output.

15. The method of claims 12, 13 or 14 in which the supplemental voltage is selected to generate a dipole field.

16. The method of claims 12, 13 or 14 wherein the supplemental r.f. voltage has at least two frequencies.

17. A multipole mass spectrometer apparatus having a plurality of parallel pairs of rod-like electrodes arranged about a longitudinal axis, an ion source near one end of said rod electrodes to project a beam of ions to be analyzed between said rods in the axial direction, and a detector near the other end of said rods to detect ions which are transmitted through said electrodes and generate an output current characterized in that the mass spectrometer includes means for applying an r.f. voltage between rods of said pairs to generate an r.f. field between said rods in which a selected range of ion masses are stable and pass through the rods and other ion masses are rejected by becoming unstable, said region of stability being determined by the r.f. voltage, its amplitude and frequency and represented by an aq stability, and means for applying a supplemental r.f. voltage across at least one of said pairs of rods to generate an r.f. field which excites one or more frequencies of the selected ion's natural motion at low $\beta$ whereby to eject unstable ions from said rods by resonance instability to provide a notch in the output current, means for frequency modulating the supplemental r.f. voltage at a predetermined rate which is slow in comparison to the ion transit time through said rods whereby the output current is modulated at said rate, and means for demodulating said output current signal to provide an output.

18. A mass spectrometer as in claim 17 including means for applying a second supplemental r.f. voltage across at least one of said pairs of rods to generate an r.f. field which excites one or more frequencies of the selected ions' natural motions at low $\beta$ whereby to eject unstable ions from said rods by resonance instability to provide a second notch in the output current which overlaps one edge of the first notch to form a composite notch.

19. A mass spectrometer as in claim 18 in which the second supplemental r.f. voltage is modulated at a second rate which is slow in comparison to the ion transit time through said rods whereby the output current is modulated at said rate and means for demodulating at said second rate to provide an output.

20. Mass spectrometer as in claims 18 or 19 in which two or more pairs of supplementary voltages are applied to form two or more composite notches.

21. A multipole tandem mass spectrometer apparatus having a plurality of tandem sections, each including a plurality of electrodes arranged about a longitudinal axis, an ion source near one end of the first tandem section to project a beam of ions to be analyzed between said rods in an axial direction, and a detector near the end of the last tandem section to detect ions which are transmitted through said sections and generate an output signal including means for applying an r.f. voltage between rods of said pairs of each of said sections in which a selected range of ion masses are stable and pass through the rods of each section while unwanted ions are rejected by becoming unstable, said regions of stability being determined by the amplitude and frequency of the r.f. voltage as represented by the a,q stability, and means for applying a supplemental r.f. voltage selected to excite one or more frequencies of the selected ions' natural motion at low or high $\beta$ modulated at first frequency $f_1$ to said first section, introducing a collision gas in one tandem section to produce collision induced dissociation, applying a supplemental r.f. voltage selected to excite one or more frequencies of the selected ions' natural motion at low or high $\beta$ to the next tandem section modulated at a second frequency $f_2$, and detecting ion currents having frequencies $f_1+f_2$ and $f_1-f_2$ which represents the daughter ion current originally carried by the ions selected in the first tandem section.

* * * * *